United States Patent [19]

Horike et al.

[11] 4,217,595

[45] Aug. 12, 1980

[54] CHARGING PHASE CONTROL DEVICE FOR INK JET RECORDING DEVICE

[75] Inventors: Masanori Horike, Yokohama; Koichiro Jinnai, Kawasaki; Kyuhachiro Iwasaki, Fujisawa; Yutaka Kodama, Tokyo, all of Japan

[73] Assignee: Ricoh Company, Ltd., Tokyo, Japan

[21] Appl. No.: 33,125

[22] Filed: Apr. 25, 1979

[30] Foreign Application Priority Data

Apr. 27, 1978 [JP] Japan .................................. 53/50424
May 12, 1978 [JP] Japan .................................. 53/56224
May 12, 1978 [JP] Japan .................................. 53/56225
May 15, 1978 [JP] Japan .................................. 53/57424

[51] Int. Cl.² ............................................. G01D 15/18
[52] U.S. Cl. ...................................................... 346/75
[58] Field of Search ......................................... 346/75

[56] References Cited

U.S. PATENT DOCUMENTS

| | | | |
|---|---|---|---|
| 3,833,910 | 9/1974 | Chen | 346/75 X |
| 3,846,800 | 11/1974 | Chen | 346/75 X |
| 4,068,241 | 1/1978 | Yamada | 346/75 |
| 4,086,601 | 4/1978 | Fillmore et al. | 346/75 |
| 4,150,384 | 4/1979 | Meece | 346/75 |

OTHER PUBLICATIONS

Chen, W. H. et al., Feedback for Synchronized Pressure Jet Using Optical Sensor, IBM Tech. Disc. Bulletin, May 1974, vol. 16, No. 12, pp. 3877–3878.

*Primary Examiner*—George H. Miller, Jr.
*Attorney, Agent, or Firm*—Burgess, Ryan and Wayne

[57] ABSTRACT

A charging phase control device for an ink jet recording device wherein the ink droplets are positively or negatively charged in the recording mode. In the charging phase detection mode an ink droplet charging electrode is so energized that more than two successive ink droplets may be negatively or positively charged and one or more ink droplets which immediately follow said more than two successive, negatively or positively charged ink droplets may be uncharged or positively or negatively charged. The negatively or positively charged ink droplets repel each other and attract the uncharged or positively or negatively charged ink droplets so that they coalesce into large ink droplets. Therefore the distance between an ink head and an ink droplet detection means may be reduced, the ink jet recording or printing device may be made compact in size and light in weight; and ink droplet charging phase may be detected and controlled with a higher degree of accuracy.

7 Claims, 19 Drawing Figures

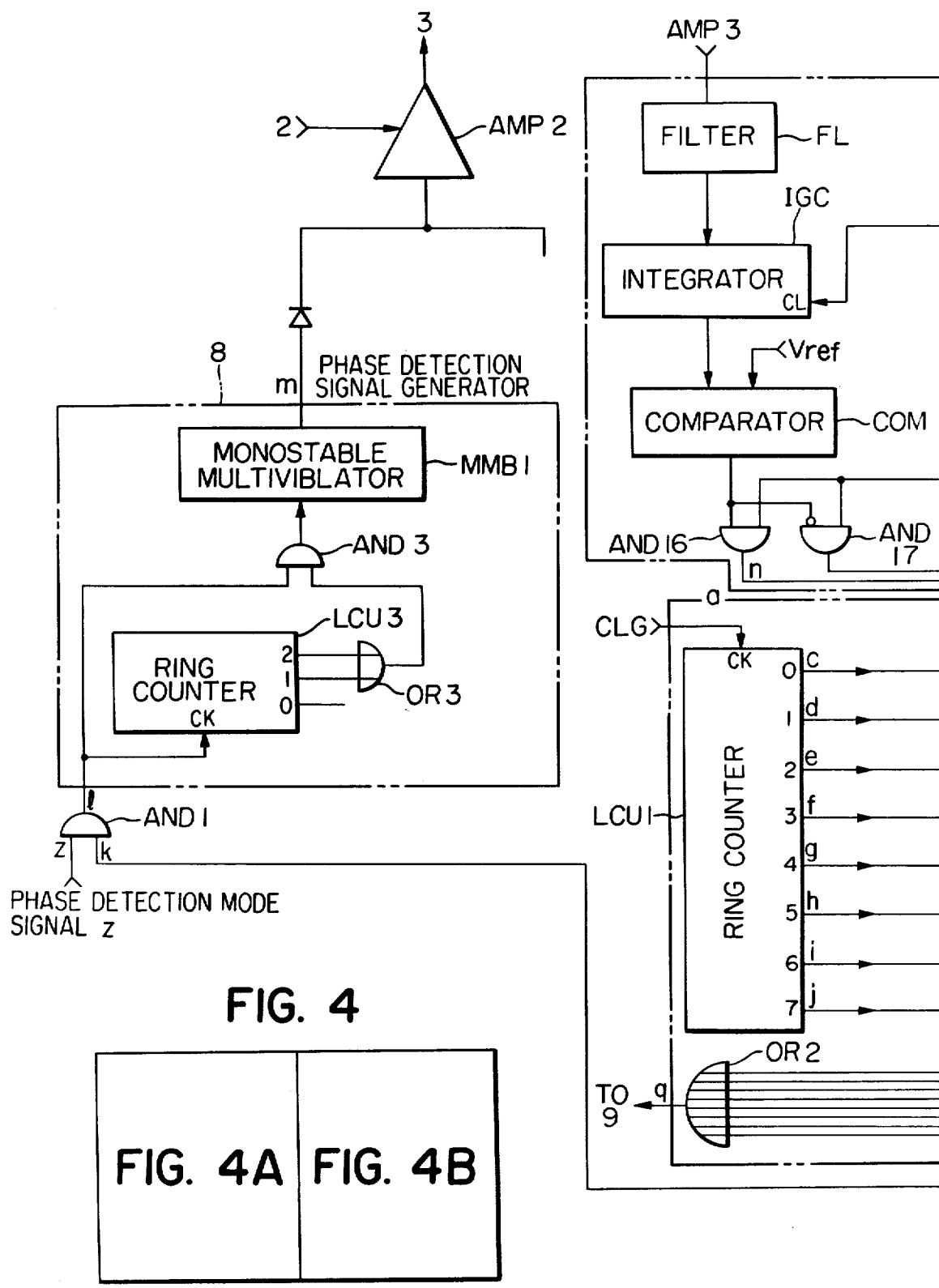

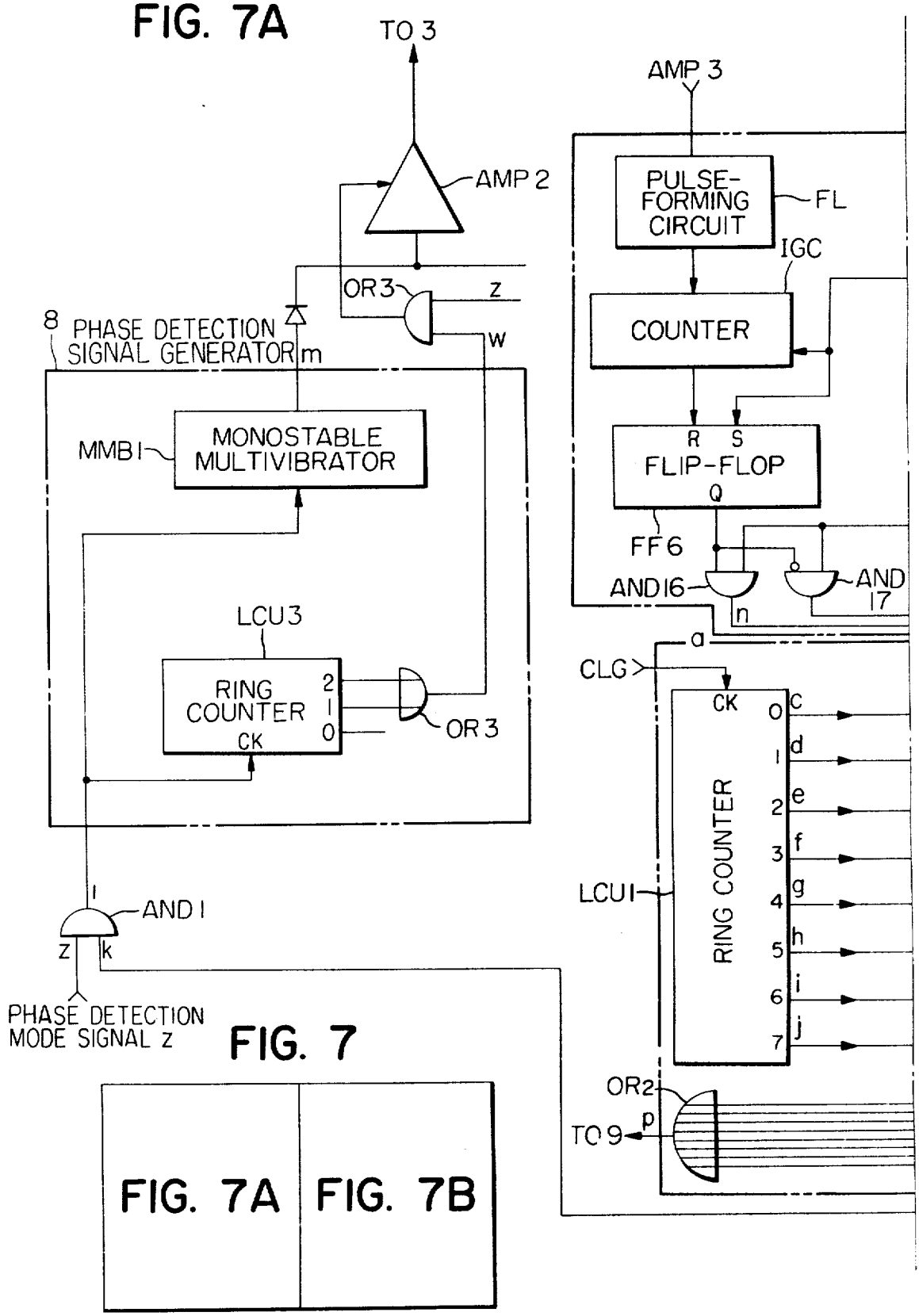

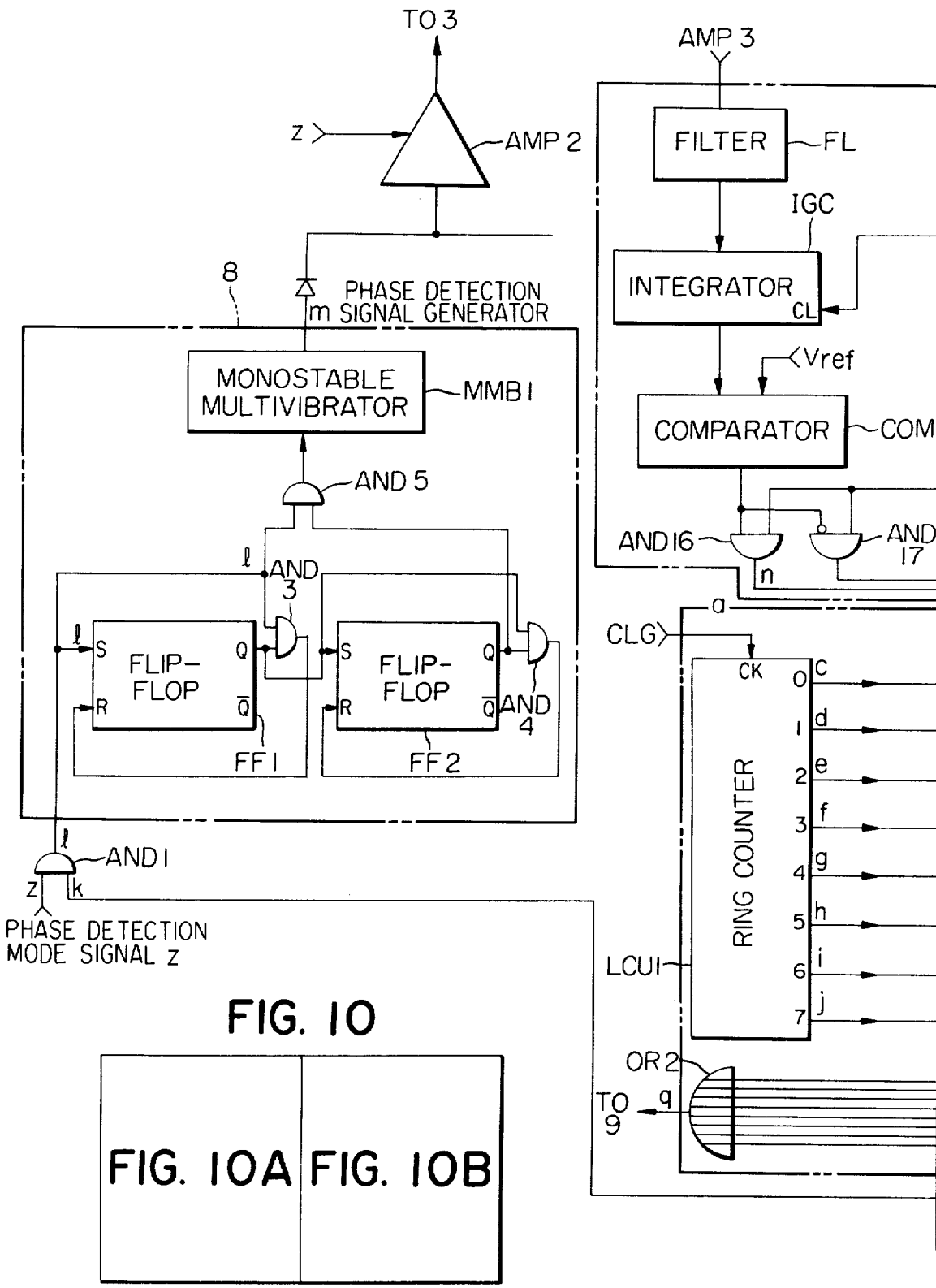

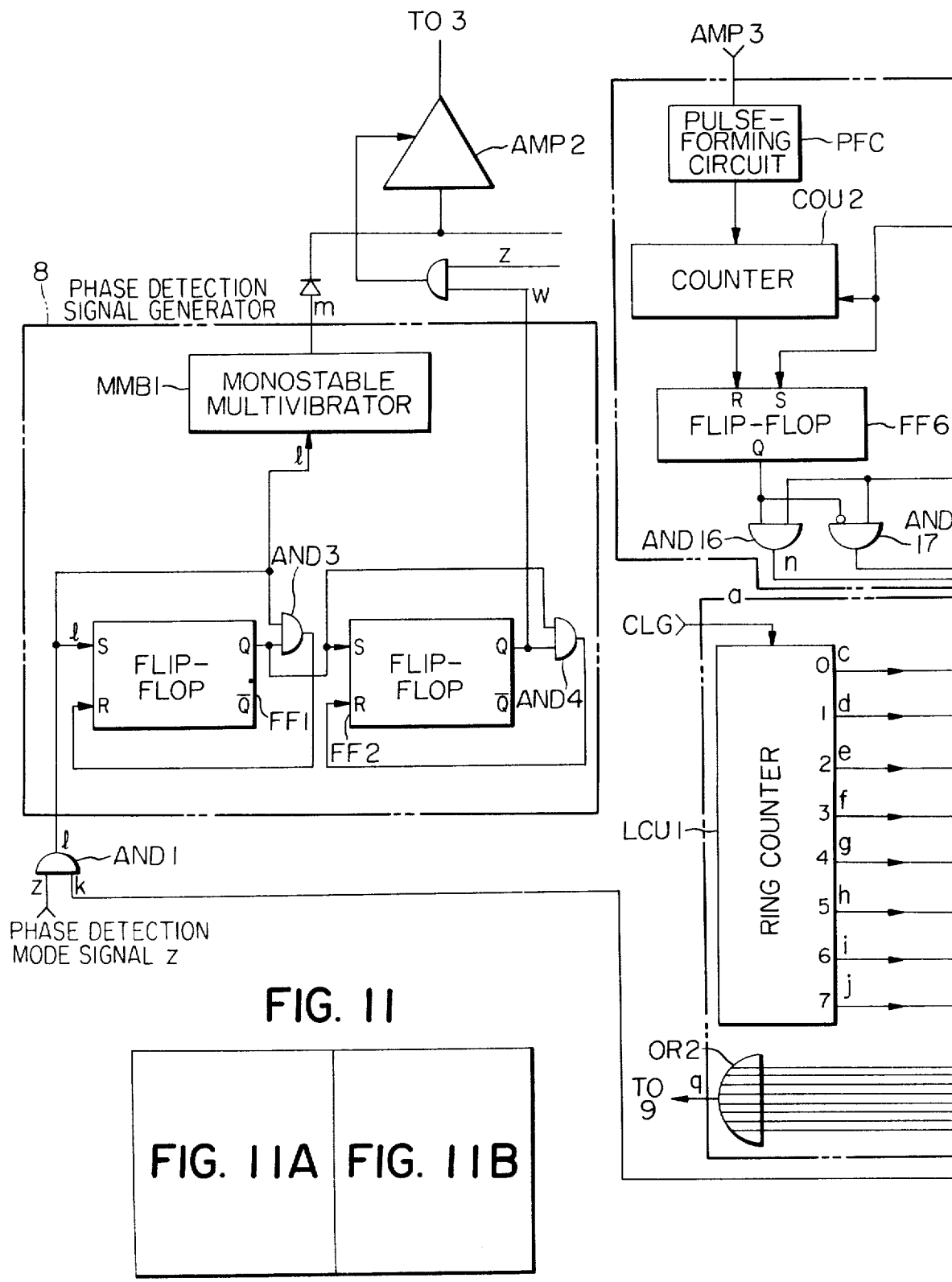

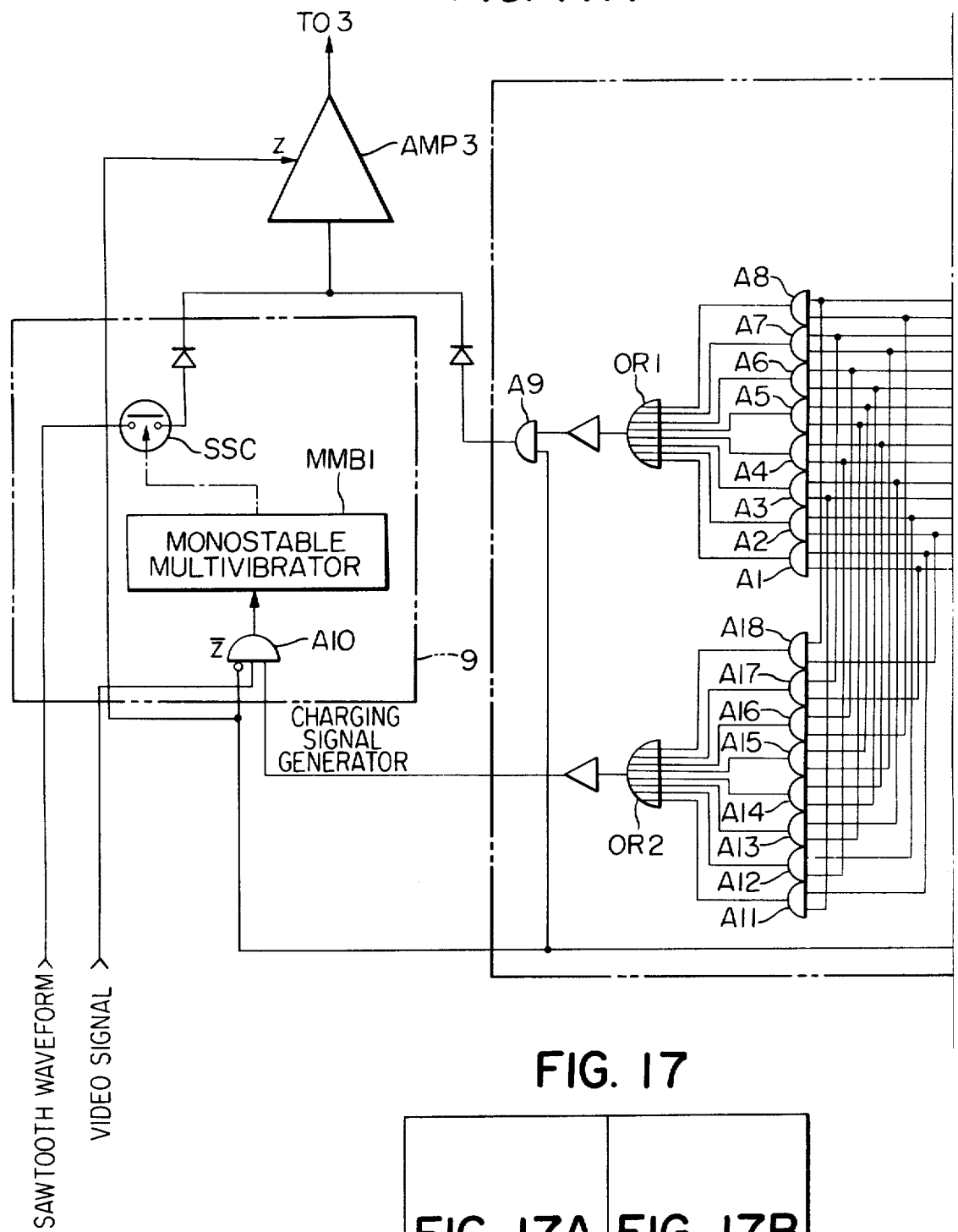

CHARGING PHASE CONTROL DEVICE FOR INK JET RECORDING DEVICE

BACKGROUND OF THE INVENTION

The present invention relates to a charge phase control device for an ink jet printing or recording device of the type wherein the ink droplet charging phase is controlled.

In the ink jet printing or recording device, ink under pressure is fed to an ink head and the exciting signal of a predetermined frequency is impressed on an oscillator of the ink head so that the ink emerging from the tip of a nozzle may be formed into a train of ink droplets. The ink droplets are selectively charged positively or negatively in response to the video signal in the recording mode when they pass through the charging electrode. The positively or negatively charged ink droplets are deflected by a pair of deflection electrodes and attracted toward a recording medium so as to be recorded thereon as dots, but the uncharged ink droplets are trapped in a gutter.

In the ink jet printing or recording device of the type described, the formation of an ink droplet at the tip of the nozzle and the charging by the charging electrode must be precisely synchronized with each other so that the ink droplets may be correctly positively or negatively charged in response to the video signal which represents the position of a pattern element. In order to attain this synchronization, there has been devised and demonstrated a charge phase control device for an ink jet printing or recording device as disclosed in for instance Japanese Patent Publication Nos. 1972-43448 and 1972-43450. In this charge control device a train of ink droplets emitted from the tip of a nozzle is intermittently charged negatively or positively in the phase detection mode prior to the recording or printing. The negatively or positively charged ink droplets and the uncharged attract each other and coalesce into large ink droplets so that the number of ink droplets per unit of time is reduced. There may be established a one-to-one correspondence between this reduction in number of ink droplets and the frequency of intermittent energizations of the charging electrode. Therefore when the number of ink droplets counted by an ink droplet detecting and counting means has a predetermined relationship with the frequency of the intermittent energizations of the charging electrode, the ink droplet formation and the ink drop charging are detected as synchronized. On the other hand when the ink droplets do not coalesce so that the number of the ink droplets per unit of time will not be reduced, it is detected that the ink droplet formation and the ink droplet charging are not synchronized with each other. Thus the charging phase is controlled accordingly.

However when the ink droplets are alternately charged negatively or positively as described above, the force acting between the adjacent charged and uncharged ink droplets is weak (because each of the uncharged ink droplets is charged positively or negatively to more than 10% of the charge on the preceding ink droplet which is negatively or positively charged). As a result the ink droplets must travel over a relatively long distance before they can coalesce, and consequently the distance between the ink nozzle and the ink droplet detecting means must be increased accordingly with the resultant increase in size and weight of the ink jet printing or recording device. The charge phase control device of the type described has a further defect that since the phase detection is made with the ink head at its initial position, the ink head must be returned to the initial position from a recording position when the phase detection is made during printing or recording. As a result, a recording or printing interruption becomes longer.

In order to overcome the above problems, there has been proposed a method (as is disclosed in IBM Technical Disclosure Bulletin Vol. 16 No. 12, May 1974, PP. 3877-3878) wherein in the phase detection mode the charged ink droplets are deflected to pass through a photosensor disposed immediately before a gutter so that whether the phase synchronization is correct or not is detected in response to the output from the photosensor. Since the photosensor must be located in the path of the ink droplets where they are caused to be deflected and because the ink droplets are small, the slit of the photosensor must be made narrow. This method has a further defect that a phase detection voltage must be adjusted and set to a predetermined level with an extremely higher degree of accuracy.

SUMMARY OF THE INVENTION

Accordingly one of the objects of the present invention is to provide a phase control device for an ink jet printing or recording device in which the distance between an ink head and an ink droplet detection means is made short and the phase of the charging voltage is controlled when a head is returned during printing or recording.

Another object of the present invention is to provide a phase control device for an ink jet printing or recording device in which in a train of ink droplets emitted from an ink jet, more than two successive ink droplets are charged negatively or positively depending upon whether they are charged positively or negatively in the case of printing or recording and one or more ink droplets immediately following the negatively or positively charged, more than two successive ink droplets are uncharged or positively or negatively charged so that the negatively or positively charged ink droplets repel each other and attract the uncharged or oppositely charged ink droplets so as to coalesce into large ink droplets more quickly and easily.

Briefly stated, the present invention provides a phase control device comprising an exciting signal generator for generating the exciting signal so as to cause the emission of ink droplets, a first charging signal generator for generating the charging signal so as to charge the ink droplets positively or negatively in the recording mode, a second charging signal generator for generating the charging signal so as to charge the ink droplets negatively or positively in the phase detection mode, a charging electrode responsive to the charging signal from the first or second charging signal generator for charging the ink droplets positively or negatively, an ink droplet detection means disposed between the charging electrode and a gutter for detecting the number of the ink droplets in a unit time flying from the charging electrode to the gutter, a frequency discriminator or a frequency counter for integrating or counting the ink droplet detection pulses from said ink droplet detection means so as to discriminate or count the frequency of said pulses and generating a flag signal when the discriminated frequency or the counted frequency is less than a predetermined value, and a phase setting circuit responsive to the flag signal from the frequency discriminator or the frequency counter for locking the phase of the exciting signal to the phase of the ink droplet charging, whereby in response to the phase detection mode signal, the second charging signal generator, the frequency discriminator or the frequency counter and the phase setting circuit are energized so that the charging electrode may receive the negative or positive pulse voltages of the same frequency with that of the exciting signal, thereby charging the ink droplets in such a way that more than two successive ink droplets may be negatively or positively charged and one or more succeeding ink droplets may be uncharged or positively or negatively charged, whereby a pack of negatively or positively charged ink droplets and a pack of uncharged, or positively or negatively charged ink droplet or droplets alternate in a train of ink droplets passing through the ink droplet detection means.

BRIEF DESCRIPTION OF THE DRAWINGS

Same reference numerals are used to designate similar parts throughout the figures.

DESCRIPTION OF THE PREFERRED EMBODIMENTS

Figure 1:
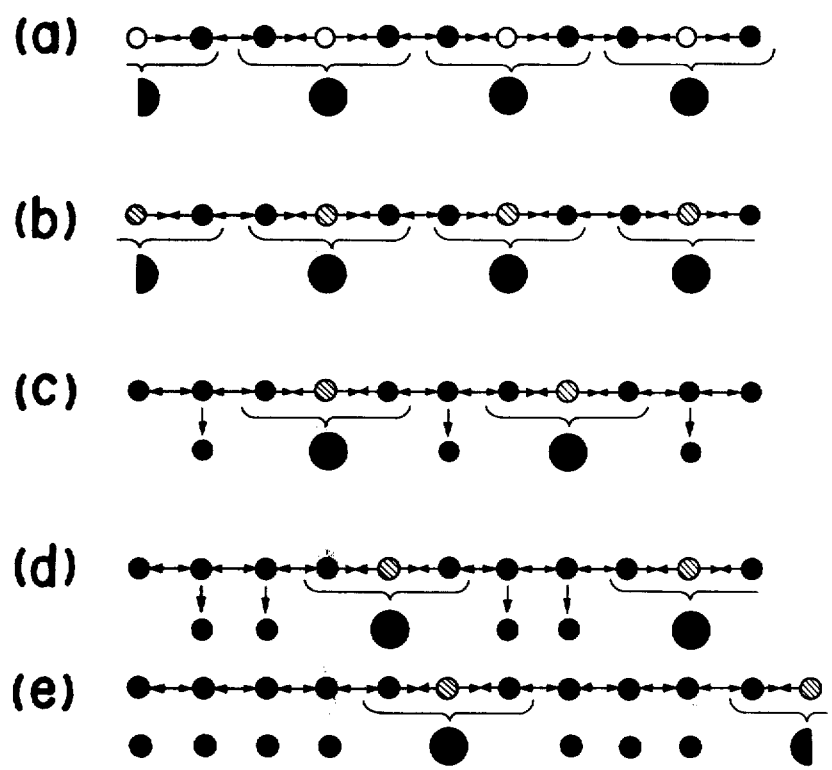
FIGS. 1 and 2 are views used for the underlying principles of the present invention.

In FIG. 1 is shown the underlying principle of the present invention. In a train of ink droplets shown in FIG. 1(a), the ink droplets (black dots) charged with the polarity opposite to the polarity with which the ink droplets are attracted toward a recording medium and the ink droplets (white dots) which are not charged alternate. The charged ink droplets repel each other, and one uncharged ink droplet and two charged ink droplets immediately preceding and succeeding the uncharged ink droplet coalesce into a large ink droplet with a mass increased three times as much as the initial mass of each ink droplet. Therefore the charge phase may be detected because the number of ink droplets traveling within a unit of time is reduced to about ⅓ (including allowable errors). The coalesced droplets are oppositely charged so that they are collected in a gutter.

In a train of ink droplets shown in FIG. 1(b), the ink droplets are alternately charged positively and negatively, the positively charged ink droplets being attracted to a recording medium. The negatively charged ink droplets (black dots) repel each other, but attract the positively charged droplets (hatched dots). As a result, one positively charged ink droplet and two negatively charged ink droplets immediately preceding and succeeding the positively charged ink droplet coalesce into a large ink droplet with the mass increased three times as much as the original mass.

In a train of ink droplets shown in FIG. 1(c) a group of three successive ink droplets are negatively charged while the ink droplet immediately following this group is positively charged. The result is therefore that the large ink droplets with the mass increased three times as much as the original mass and the small, negatively charged ink droplets alternate. When only the large or coalesced ink droplets with the mass of three times are detected, the number of ink droplets traveling in a unit of time is reduced to ¼ so that the charge phase may be again detected.

In a train of ink droplets shown in FIG. 1(d), a group of four successive ink droplets are negatively charged and the ink droplet immediately following this group is positively charged. The result is therefore that the large or coalesced ink droplets with the mass of three times and two successive negatively charged ink droplets alternate. The number of the ink droplets traveling in a unit of time is then reduced to 3/5 so that the charge phase may be detected. Alternatively, only the large or coalesced ink droplets with the mass of three times may be counted so that the number of ink droplets traveling in a unit of time is reduced to 1/5. By this counting method, the charge phase may be also detected.

In a train of ink droplets shown in FIG. 1(e), a group of five successive ink droplets are negatively charged and the ink droplet immediately following this group or the 6-th ink droplet is positively charged. Again one positively charged ink droplet and two negatively charged ink droplets coalesce into a large ink droplet. When only the large or coalesced ink droplets are counted again, the number of the ink droplets counted in a unit of time is reduced to 1/6. Thus the charge phase may be detected.

In like manner, six successive ink droplets may be charged negatively while the 7-th ink droplet may be charged positively. The charge phase detection is effected again by counting only the large or coalesced ink droplets with the mass of three times as much as the initial mass of each ink droplet.

Prior to the explanation of another underlying principle of the present invention, it is assumed that the ink droplets positively charged are attracted toward a recording medium. According to this principle, more than two successive ink droplets following two successive ink droplets which are negatively charged are uncharged or positively charged.

Figure 2:
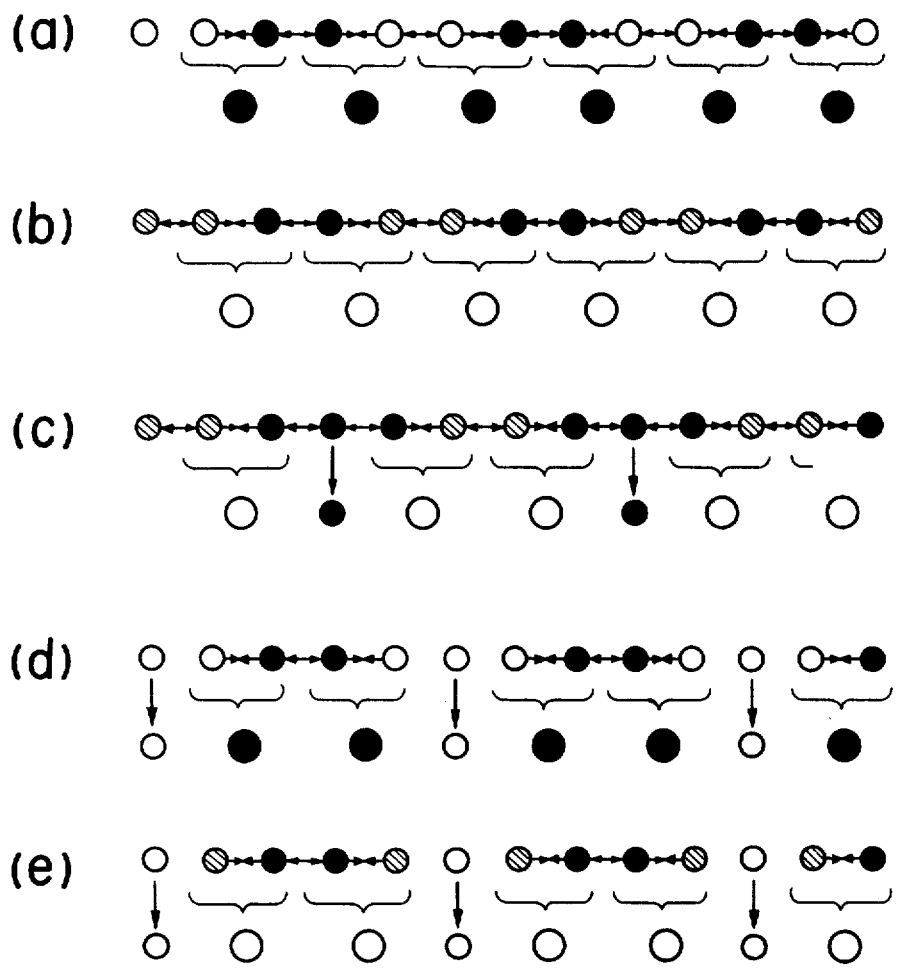

In a train of ink droplets shown in FIG. 2(a), two successive, negatively charged ink droplets (black dots) and two successive, uncharged ink droplets (white dots) alternate. The negatively charged ink droplets repel each other, and the uncharged ink droplets are positively charged and consequently repel each other. The result is therefore that the oppositely charged ink droplets coalesce into a large ink droplet with a mass two times as much as the initial mass of each ink droplet. The number of the large or coalesced ink droplets counted in a unit of time is therefore reduced to ½ (including allowable errors) so that the charge phase may be detected. The coalesced ink droplets are negatively charged so that they are collected in a gutter.

In a train of ink droplets shown in FIG. 2(b), two successive, negatively charged ink droplets (black dots) and two successive, positively charged ink droplets (hatched dots) alternate. The negatively charged ink droplets repel each other while the positively charged ink droplets repel each other, and the oppositely charged ink droplets attract each other. Coalescence between the oppositely charged ink droplets is faster in this example. Again the number of the coalesced ink droplets counted in a unit of time is reduced to ½ so that the charge phase may be detected. The large or coalesced ink droplets are uncharged or negatively charged (because the positive and negative charging levels are previously so determine as to attain such results) so that they are collected in a gutter.

In a train of ink droplets shown in FIG. 2(c), the charge pattern is such that three successive ink droplets are charged negatively and two successive ink droplets are charged positively. The resulting pattern is therefore such that two successive large or coalesced ink droplets and one negatively charged ink droplet. The number of the ink droplets counted in a unit of time is reduced to 3/5. When only the large or coalesced ink droplets are counted, the number is reduced to 2/5. The charge phase detection may be effected by either of the counting methods, but in accordance with the present invention, means is provided for counting only the large or coalesced ink droplets as will be described in detail hereinafter. That is, the charge phase is detected by detecting the reduction of the number of large or coalesced ink droplets to 2/5.

In a train of ink droplets shown in FIG. 2(d), the charge pattern is such that two negatively charged ink droplets succeed and then three uncharged ink droplets follow. Since the large or coalesced ink droplets are counted, the number is reduced to 2/5.

In a train of ink droplets shown in FIG. 2(e), two negatively charged ink droplets succeed and then one positively charged ink droplet and one uncharged ink droplet and then one positively charged ink droplet follow in the order named. Since only the coalesced ink droplets are counted, the number of ink droplets counted in a unit of time is reduced to 2/5. Thus the charge phase detection is effected.

In like manner, the charge pattern is such that more than four ink droplets may be successively negatively charged and then more than four ink droplets may be successively positively charged or more than four uncharged ink droplets may follow.

In all cases, the ink droplets which travel between a pair of deflection electrodes must be charged negatively or must be uncharged and must be collected in a gutter for the charge phase detection. Furthermore only the large ink droplets coalesced from more than two ink droplets must be counted so as to improve the degree of detection.

First Embodiment, FIGS. 3–8

Figure 3:
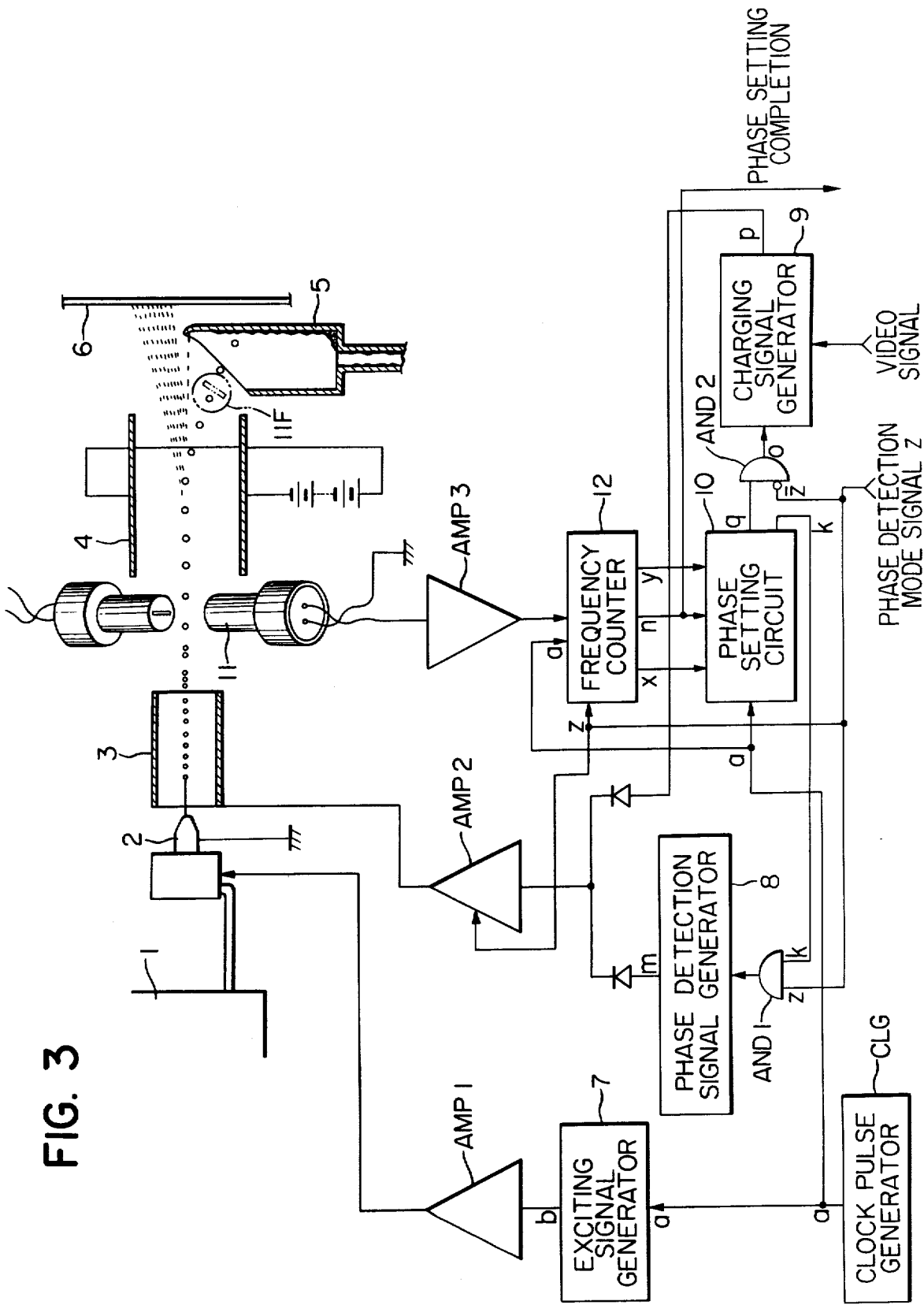
FIG. 3 is a block diagram of a first embodiment of the present invention.

In FIG. 3 is shown a first embodiment of the present invention, wherein 1 denotes an ink tank; 2, an ink jet nozzle; 3, a charging electrode; 4, a pair of deflection electrodes; 5, a gutter; and 6, a recording medium.

The oscillation of the ink jet nozzle or the ink therein is caused by an electrostrictive oscillator which in turn is energized by the output pulse from an oscillation or exciting signal generator 7 which is amplified by an amplifier AMP1. The oscillation or exciting signal generator 7 may be of the conventional type wherein a monostable multivibrator generates a train of exciting pulses with a predetermined pulse width and at a predetermined frequency in response to the pulses obtained by the frequency division of the clock pulses.

In the case of the charge phase detection, the charging electrode 3 is impressed with the charging voltage from an amplifier AMP2 which in turn is connected to a detection signal generator 8. In the case of printing or recording, the charging electrode 3 is connected through the amplifier AMP2 to a charging signal generator 9. The amplifier AMP2 is such that the polarity of its output changes in response to the input signal. The charging signal generator 9 may be of the conventional type comprising a monostable multivibrator and an analog gate. In response to a reference signal the monostable multivibrator is driven to generate a train of pulses with a predetermined pulse width. The analog gate is opened during the interval between the pulses so as to produce the video signals (P) the levels of which represent the positions of the pattern elements.

The detection signal generator 8 is connected through an AND gate AND1 to a phase setting circuit 10 so as to receive the charge phase reference signal k. In like manner, the chargng signal generator 9 is connected through a gate AND2 to the phase setting circuit 10 so as to receive the charge reference signal Q.

A photosensor 11 is interposed between the charging electrode 3 and the deflection electrodes 4 at a suitable position at which three successive ink droplets coalesce into a large droplet in the manner elsewhere when the phase pattern is correct. The photosensor 11 counts the number of coalesced ink droplets, the output being transmitted through an amplifier AMP3 to a frequency discriminator or frequency counter 12.

Next the mode of operation of the first embodiment with the above construction will be described. It is assumed that the frequency of the output pulses a from the clock pulse genertor CLG be f-a and their period be Ta. Then the exciting signal generator 7 generates the exciting pulses b whose frequency is fa/8. Therefore the ink jet nozzle 2 emits the ink droplets at an interval of fa/8. The phase setting circuit 10 generates eight trains of pulses c-j (See FIG. 5) whose frequency is fa/8 and which are out of phase with each other by Ta. One pulse train k is transmitted through the gate AND1 to the detection signal generator 8. The detection signal generator 8 eliminates one pulse out of every three pulses of the pulse train k (See FIG. 5, k), thereby generating a new pulse train (m) (See FIG. 5, m) with the pulse width Ta.

The charging signal generator 9 generates the charging pulses whose pulse width is Ta and whose levels represent those of the pattern element signals.

The detection instruction signal z is "0" in the case of the recording, but becomes "1" in the case of the phase detection. When the signal z is "1", the amplifier AMP2 is switched from the recording mode to the detection mode, the polarities of the outputs being opposite in the recording and detection modes. The output k from the phase setting circuit 10 is transmitted through the gate AND1 to the detection signal generator 8. When the output k has a predetermined phase relationship with the exciting pulses b, the charge pattern of the ink droplets passing through the charging electrode 3 is such that two successive negatively charged ink droplets are followed by one uncharged ink droplet as shown in FIG. 1(a). As described elsewhere, two negatively charged ink droplets and one uncharged ink droplet immediately coalesce into a large ink droplet so that the coalesced ink droplets pass through the photometer 11 at the rate of $fa/24$ $(=fa/8 \times \frac{1}{3})$.

However when the output k from the phase setting circuit 10 is out of phase, no ink droplet will be charged. As a result the ink droplets pass through the photosensor 11 at the rate of $fa/24 < N \leq fa/8$.

The frequency discriminator or counter 12 generates a flag signal at $fa/24$ so that the output pulses from the phase setting circuit are set in phase. When $fa/24 < W \leq fa/8$ the phase setting circuit 10 automatically progressively advances or lags the phase of the output pulses K. That is, one of the eight pulse trains (c–j, in FIG. 5) is derived and applied to the detection signal generator 8 through the gate AND1. Then in response to one pulse train (c–j), the coalesced ink droplets pass through the photoelectric sensor 11 at the rate of $fa/24$ so that the phase shift operation of the phase setting circuit 10 is automatically suspended.

The phase detection mode is then switched to the recording mode. The gate AND1 is closed while the gate AND2 is opened, and the polarity of the output pulses from the amplifier AMP2 is switched to positive. The ink droplet train now travels at the rate of fa/8 and is attracted toward the recording medium 6 with each ink droplet following a path or impinging against the gutter 5 in response to the corresponding video signal as indicated by dotted lines in FIG. 3.

Figure 4B:
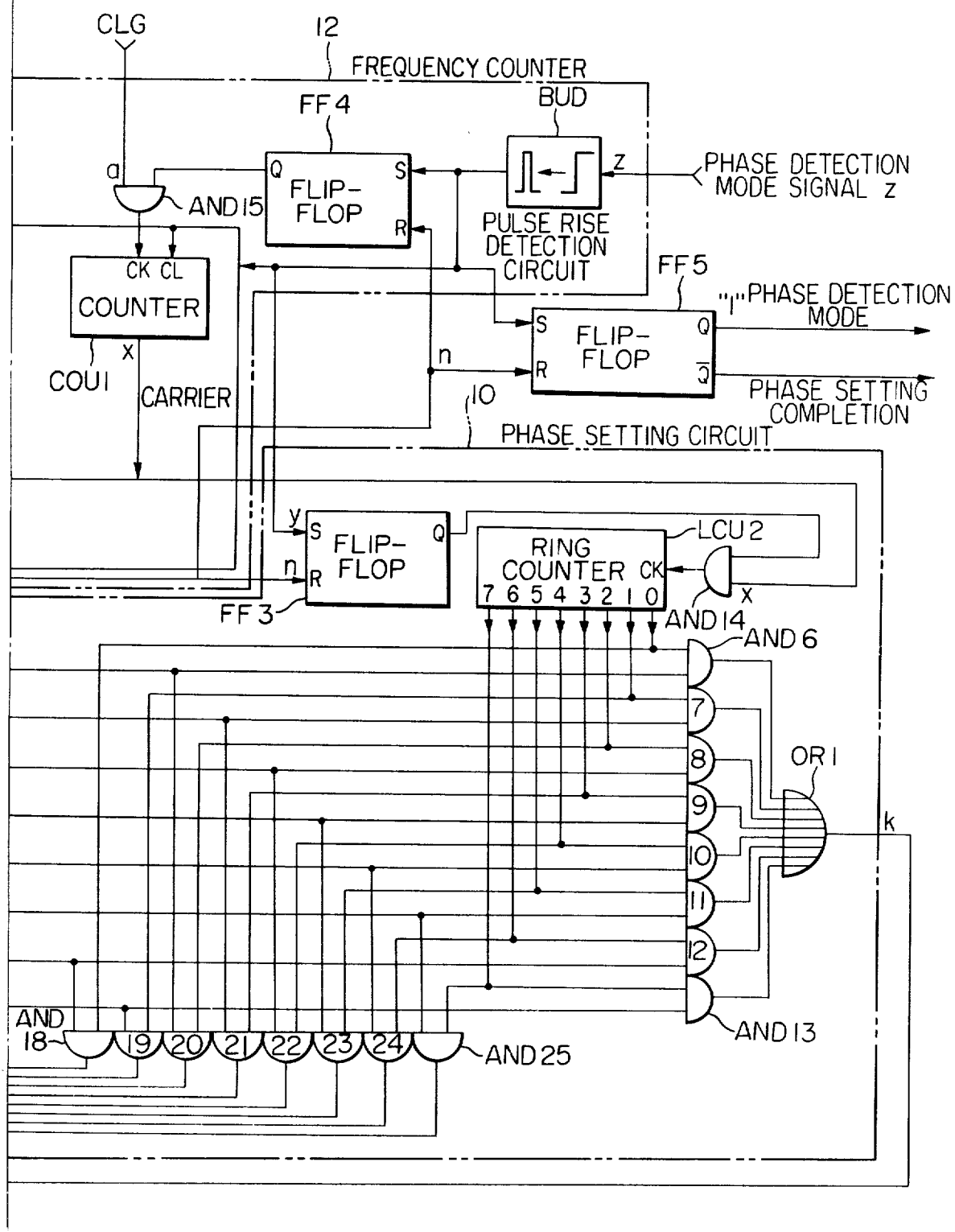
FIG. 4 is a circuit diagram of an exciting signal generator 8, a phase setting circuit 10 and a frequency counter 12 thereof.
Figure 5:
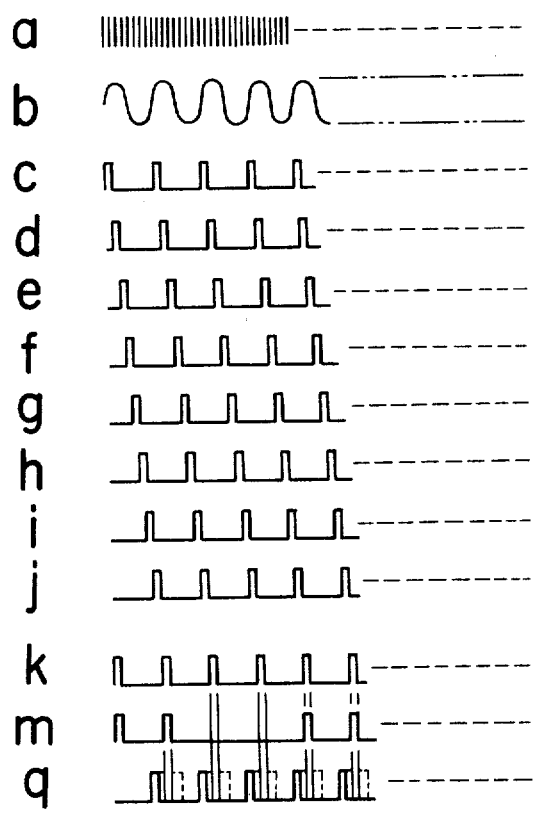
FIG. 5 shows waveforms of various signals and pulses generated in the first embodiment shown in FIG. 1.
Figure 8:
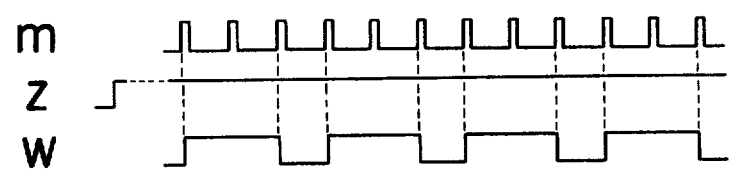
FIG. 8 shows waveforms of pulses used for the explanation of the mode of operation of the modification shown in FIG. 7.

Next referring to FIG. 4, the detection signal generator 8, the phase setting circuit 10 and the frequency discriminator or the frequency counter 12 will be described in more detail below.

The phase detection signal generator 8 comprises a monostable multivibrator MMB1, a ring counter LCU3, an AND gate 3 and an OR gate OR3. In the ring counter LCU3 the "1" state shifts the output terminals 0, 1 and 2 in turn in response to the input clock 1 so that the pulse train m is obtained as shown at m in FIG. 5. The pulse width is determined by the monostable multivibrator MMB1 to Ta (1/fa).

The phase setting circuit 10 comprises a ring counter LCU1, which is used as a frequency divider, a bank of AND gates AND6–AND13, another bank of AND gates AND18–AND25, OR gates 1 and 2, a ring counter LCU2 for selectively turning on the gates AND6–AND13 and AND18–AND25, a flip-flop FF3 for suspending the operation of the ring counter LCU2, and an AND gate AND14.

The flip-flop FF3 is set or reset in response to the rise of the input pulse. The ring counter LCU2 responds to the fall or at the negative edge of the input clock.

The frequency discriminator or the frequency counter 12 comprises a filter FL for passing only a very small band centering about $fa/24$, an integrator IGC, a comparator COM adapted to generate a high-level signal "1" when the output from the integrator IGC exceeds a predetermined reference level Vref, a pulse rise positive edge detection circuit BUD adapted to generate one pulse whenever the detection instruction signal z rises, a flip-flop FF4 which is set in response to the output pulse from the pulse rise detection circuit BUD, a counter COU1 and gates AND15–AND17.

When the detection instruction signal z becomes "1", an integrating capacitor in the integrator IGC is discharged so that the counter COU1 is cleared and the flip-flops FF3 and FF4 are set. Then the gates AND14 and AND15 are opened so that the clock pulses a (fa) are applied from the pulse generator CLG (See FIG. 3) to the counter COU1. When the counter COU1 counts a predetermined number of pulses, it generates a carrier signal. Simultaneously, in response to the clock pulses a the ring counter LCU1 generates pulse trains c–j (See FIG. 5, c–j) which in turn are applied to the gates AND6–AND13 and the gates AND18–AND25. Since "1" output is derived from one (for instance output terminal 0) of eight output terminals 0–7 of the ring counter LCU2, one pulse train (for instance c) is derived through the gate OR1 as the output pulse train k. In response to this pulse train k, the ink droplets are charged in the pattern m or as shown in FIG. 1(a) as described elsewhere.

When the output pulse train k or c is in phase, the signal at a frequency of $fa/24$ passes through the filter FL and is applied to the integrator IGC while the counter COU1 is counting. The integrated level rises and finally exceeds the reference level Vref. When the carrier is derived, the output from the comparator COM is "1" so that at the rise or positive edge of the carrier the flip-flop FF3 is reset through the gate AND16 and the gate AND14 is turned off. As a result, the ring counter LCU2, which responds to the fall or negative edge of the pulse, will not make shifts so that the output "1" remains at the same output 0. Consequently, the flip-flop FF3 remains reset while the gate AND14 remains turned off. Thus, only the pulse train c is derived as the fixed output pulse train k.

However when the pulse train c is not in phase, the output from the comparator COM will not remain "1" until the counter COU1 generates the carrier. The reason is that since the frequency N of the output signal from the photosensor 11 (See FIG. 3) is greater than or not equal to $fa/24$ as described elsewhere, the output from the filter FL which is applied to the integrator IGC is low so that the integrated output level will rise above the reference level Vref within a predetermined time interval; that is, before the carrier is generated. As a result, the flip-flop FF3 is not reset, and the carrier pulse is applied through the gates AND17 and AND14 to the ring counter LCU2. In response to the rise or positive edge of the carrier pulse, the ring counter LCU2 shifts its output "1" to the next output terminal 1. As a result, the pulse train d is derived through the gate OR1. In response to the carrier pulse, the counter COU1 and the integrator IGC are cleared and ready for determining whether the pulse train d which is now derived as the output pulse train k is in phase or out of phase.

In like manner, until the output train pulse k is detected in phase; that is, the output is derived from the gate AND16, the ring counter LCU2 sequentially shifts its output "1" from one output terminal to another at a predetermined time interval. Thus, the pulse trains c–j are sequentially derived through the gate OR1 as the output pulse train k. When one of the pulse trains c–j is detected in phase, it is fixed as the output or reference pulse train k.

For instance, assume that the pulse train c be selected as the output or reference pulse train k. Then the pulse train i is transmitted through the gate AND18 and the gate OR2 to the charging signal generator 9. In response to the low level "0" of the detection instruction signal z, the monostable multivibrator in the charging signal generator 9 is triggered in response to the output q from the gate OR2 so that, as shown at q in FIG. 5, the pulses with a wide pulse width are derived, the center of each pulse being in line with that of each pulse in the pulse train m. Thus obtained pulse train q is used to determine the charging period.

Figure 6:
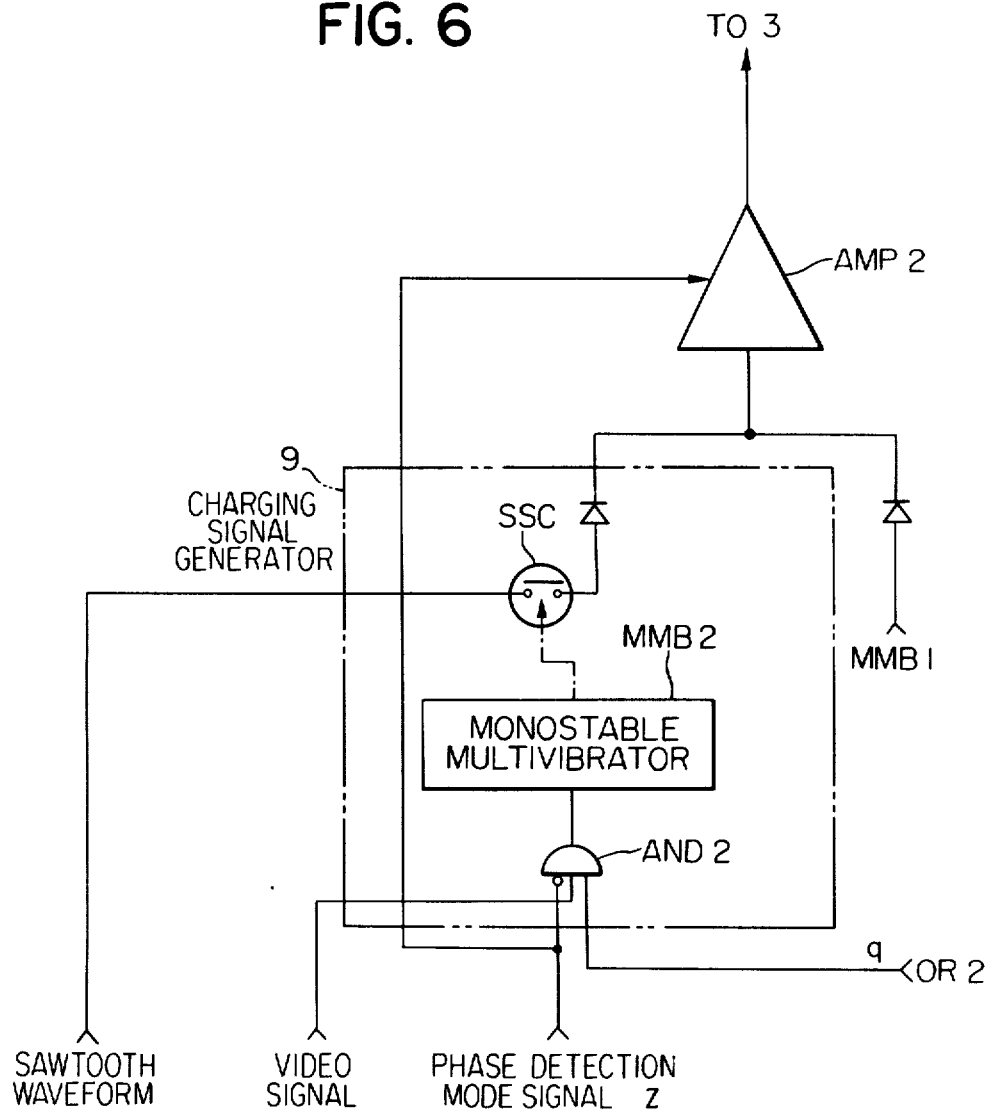
FIG. 6 is a block diagram of a charging signal generator (second) of the first embodiment shown in FIG. 1.

FIG. 6 shows in detail the construction of the charging signal generator 9. An AND gate AND2 passes the output from the gate OR2 when the detection instruction signal z is at a low level "0" and the video signal is at a high level "1". In response to the output from the gate AND2, a monostable multivibrator MMB2 generates the pulses which determine the charging period. That is, in response to the output from the monostable multivibrator MMB2, a semiconductor switching circuit SSC is closed so that part of the sawtooth waveform deflection voltage for deflecting the ink droplets is applied to the amplifier AMP2.

Referring back to FIG. 5, the flip-flop FF5 is set in response to the output pulse from the pulse rise or positive edge detection circuit BUD and is reset in response to the output n from the gate AND16. Therefore the output "1" derived from the Q output terminal represents the phase detection mode while the output "1" derived from the $\bar{Q}$ output terminal represents the phase setting completion.

Figure 7B:
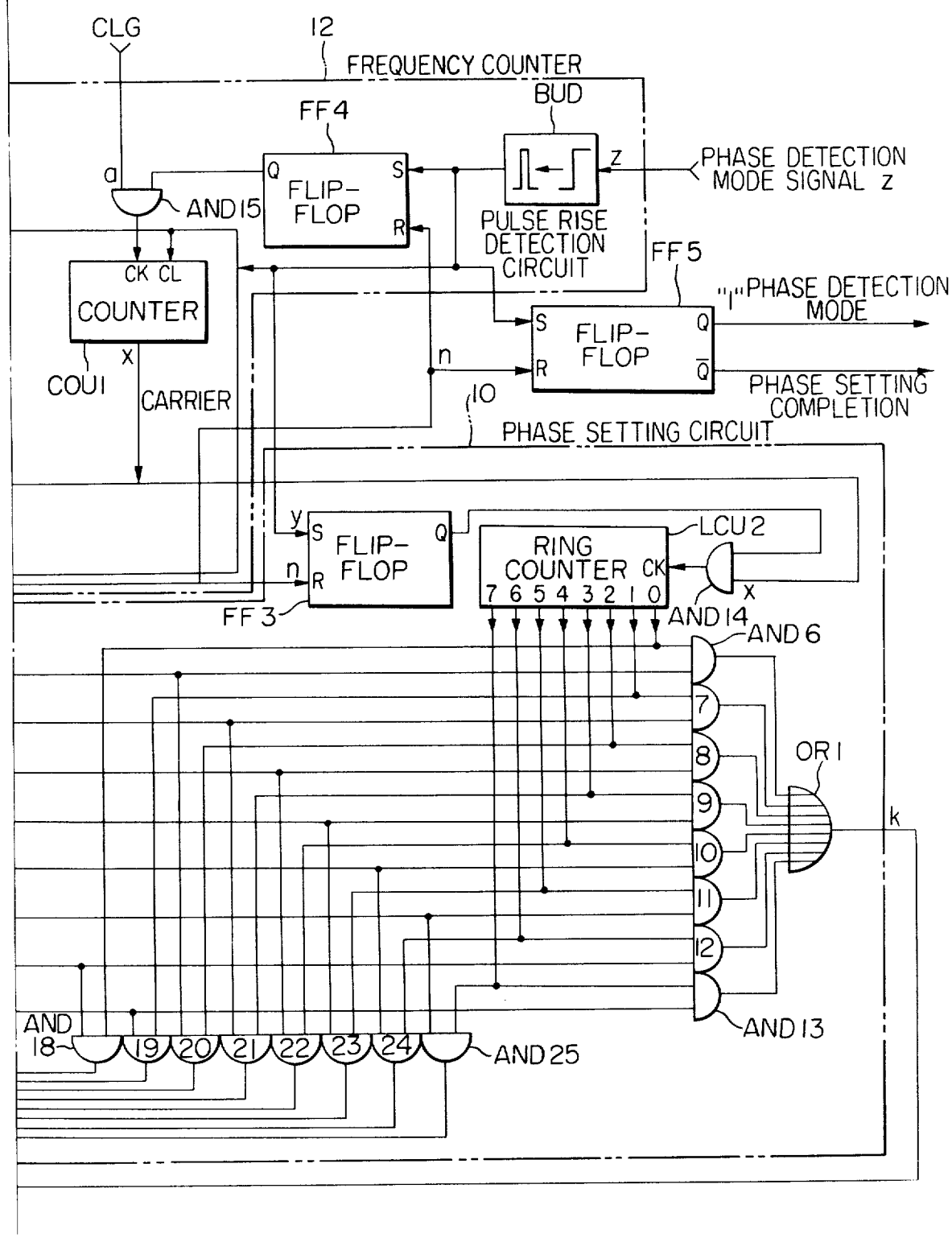
FIG. 7 is a circuit diagram of a modification of the first embodiment.

In FIG. 7 is shown a modification of the first embodiment. Instead of the filter FL, the integrator IGC and the comparator COM in the frequency discriminator or the frequency counter 12, a wave-shaping circuit or a pulse-forming circuit PFC, a counter COU2 and a flip-flop FF6 are used. The detection signal generator 8 generates the charging signal m which is synchronized with the output or reference pulse train k and is applied to the amplifier AMP2. In response to the output w from an OR gate OR3 the polarity of the output voltage from the amplifier AMP2 may be reversed.

The output from the photosensor 11 (See FIG. 3) is converted into pulses by the wave-shaping circuit or pulse-forming circuit PFC and applied to the counter COU2. The flip-flop FF6 is set in response to the positive edge of the detection instruction signal z and to the positive edge of the carrier pulse from the counter COU1 and is reset in response to the carrier pulse from the counter COU2. The Q output of the flip-flop FF6 is applied to the gate AND16. Therefore when the counter COU2 generates the carrier pulse before the counter COU1 counts up the number of ink droplets during a predetermined time, that is, when a large number of ink droplets is counted, the flip-flop FF6 is reset so that the carrier pulse from the counter COU1 will not pass through the gate AND16. However when the counter COU2 does not generate the carrier pulse within a predetermined time interval; that is, when the number of ink droplets counted within a predetermined time interval is less than a predetermined number, the carrier pulse from the counter COU1 passes through the gate AND16.

As described above, the charging signal or pulse train m (See FIG. 5) which is synchronized with the output or reference pulse train k is applied to the amplifier AMP2. The amplifier AMP2 energizes in response to the charging pulse train m the charging electrode 3 in such a way that one ink droplet may be charged positively and two successive ink droplets may be negatively charged as shown in the charge pattern in FIG. 1(b). Therefore as described elsewhere, the adjacent negatively charged ink droplets repel each other and are attracted to the adjacent positively charged ink droplet. Thus very quick coalesence of one positively charged ink droplet and two negatively charged ink droplets results. As a result the position of the photosensor 11 may be easily determined.

The ink droplets are charged in such a way that the sum of the charge of two negatively charged ink droplets is equal to the opposite polarity charge of one positively charged ink droplet so that the coalesced ink droplet may be uncharged. Alternatively, the sum of the negative charge of two negatively charged ink droplets is greater than the positive charge of one positively charged ink droplet so that the coalesced ink droplet may be negatively charged. Thus all the coalesced ink droplets are collected in the gutter 5 (See FIG. 3).

In summary, the voltages to be applied to the charging electrode 3 are so determined that the ink droplets are charged in such a charge pattern that the coalesced ink droplets may be uncharged or negatively charged and consequently they are all trapped in the gutter 5.

Referring back to FIG. 3, the photosensor 11 may be located at a position 11F immediately before the gutter 5 or a position upstream of the deflection electrodes 4 so as to detect the coalesced ink droplets entering them. Various types of sensors may be used as a means for detecting or counting the number of coalesced ink droplets. For instance, they are of the contact type wherein oscillation-to-electrical signal conversion means such as a piezoelectric element and electrodes are used. A noncontact type sensor may be also used in which the number of the coalesced ink droplets are counted in terms of the variations in the electric field produced between a pair of electrodes when the coalesced ink droplets pass between them. The contact type sensor is preferably located within the gutter.

Figure 9:
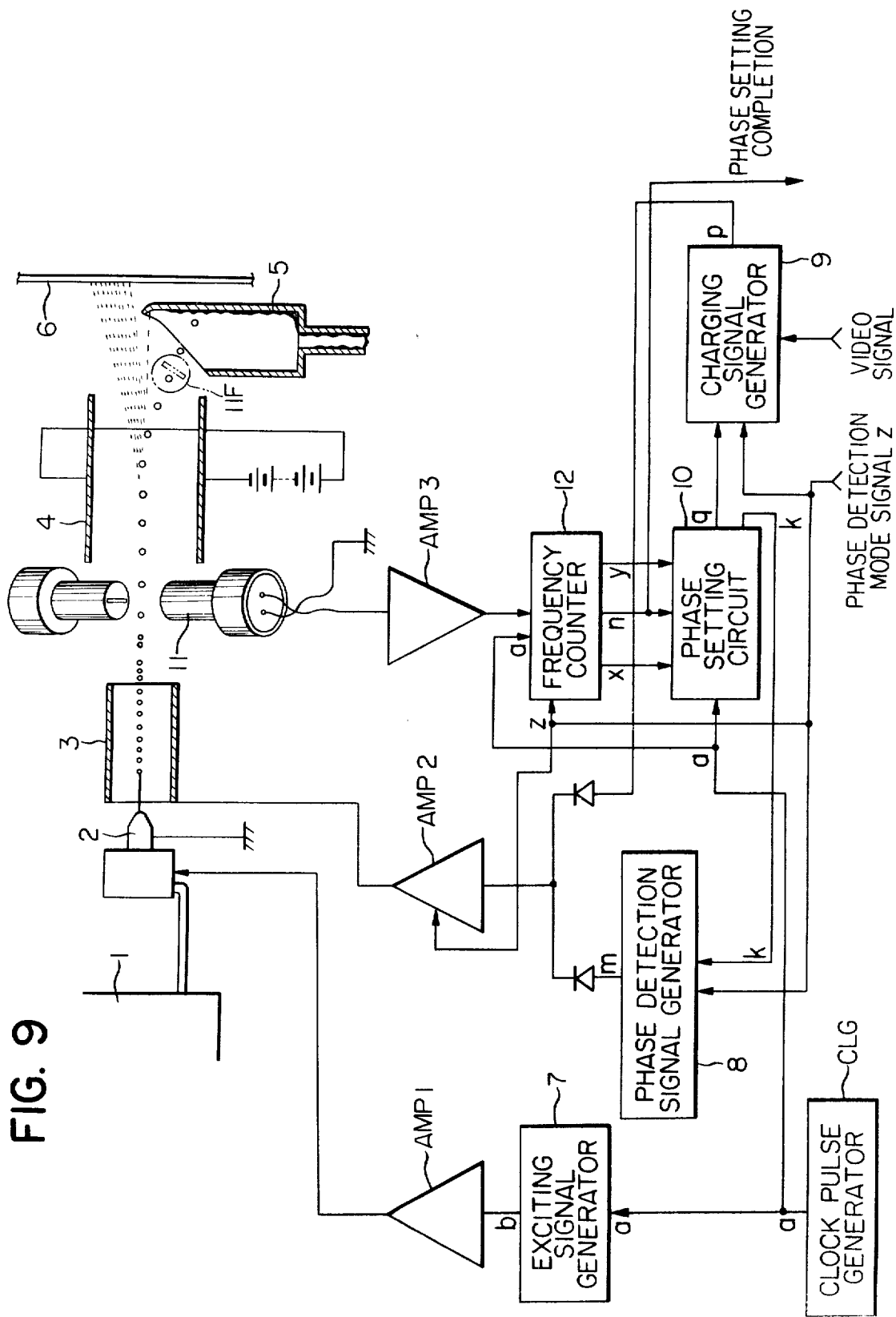
FIG. 9 is a block diagram of a second embodiment of the present invention.
Figure 10B:
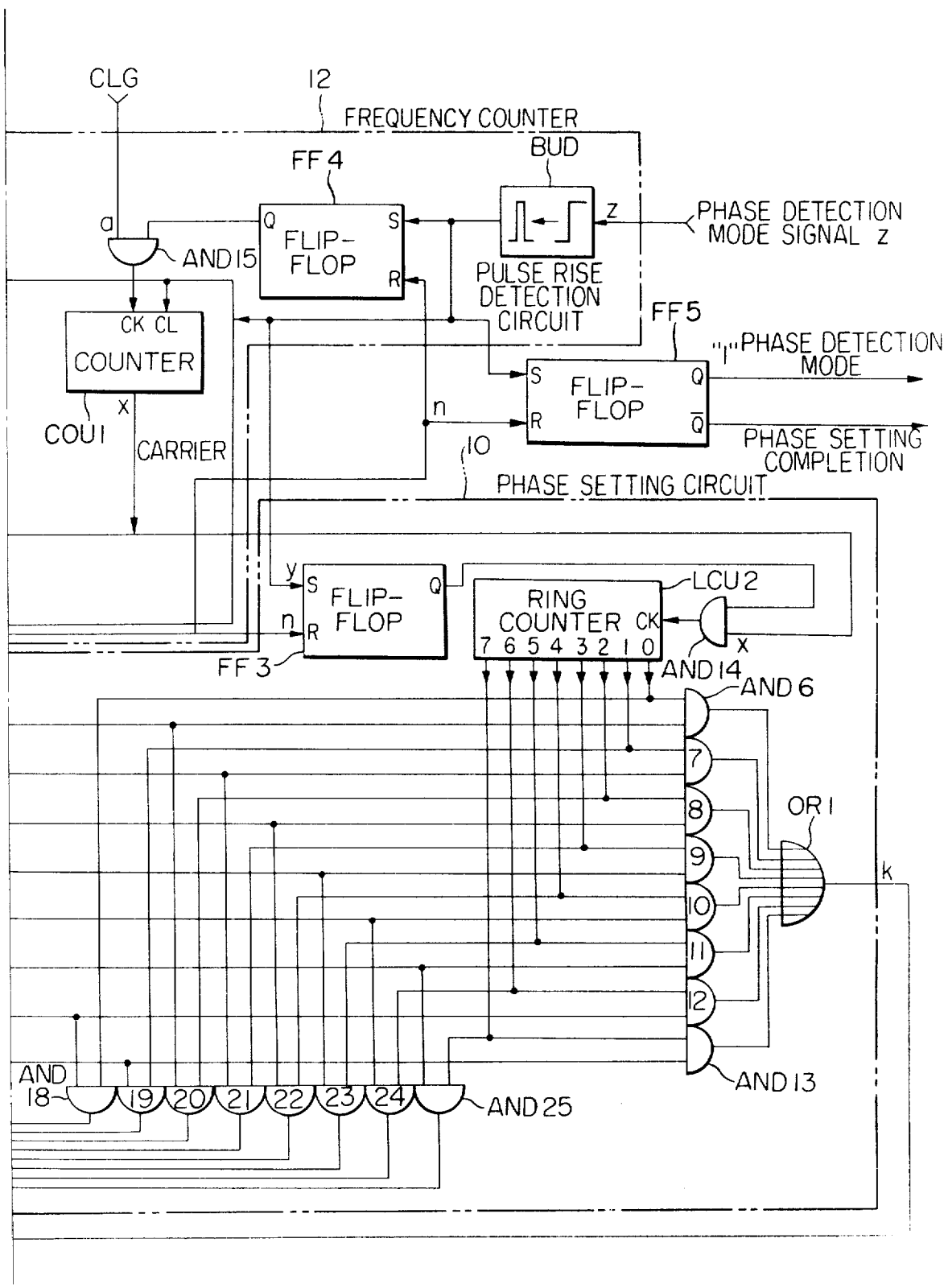
FIG. 10 is a circuit diagram of an exciting signal generator 8, a phase setting circuit 10 and a frequency counter 12 thereof.
Figure 11B:
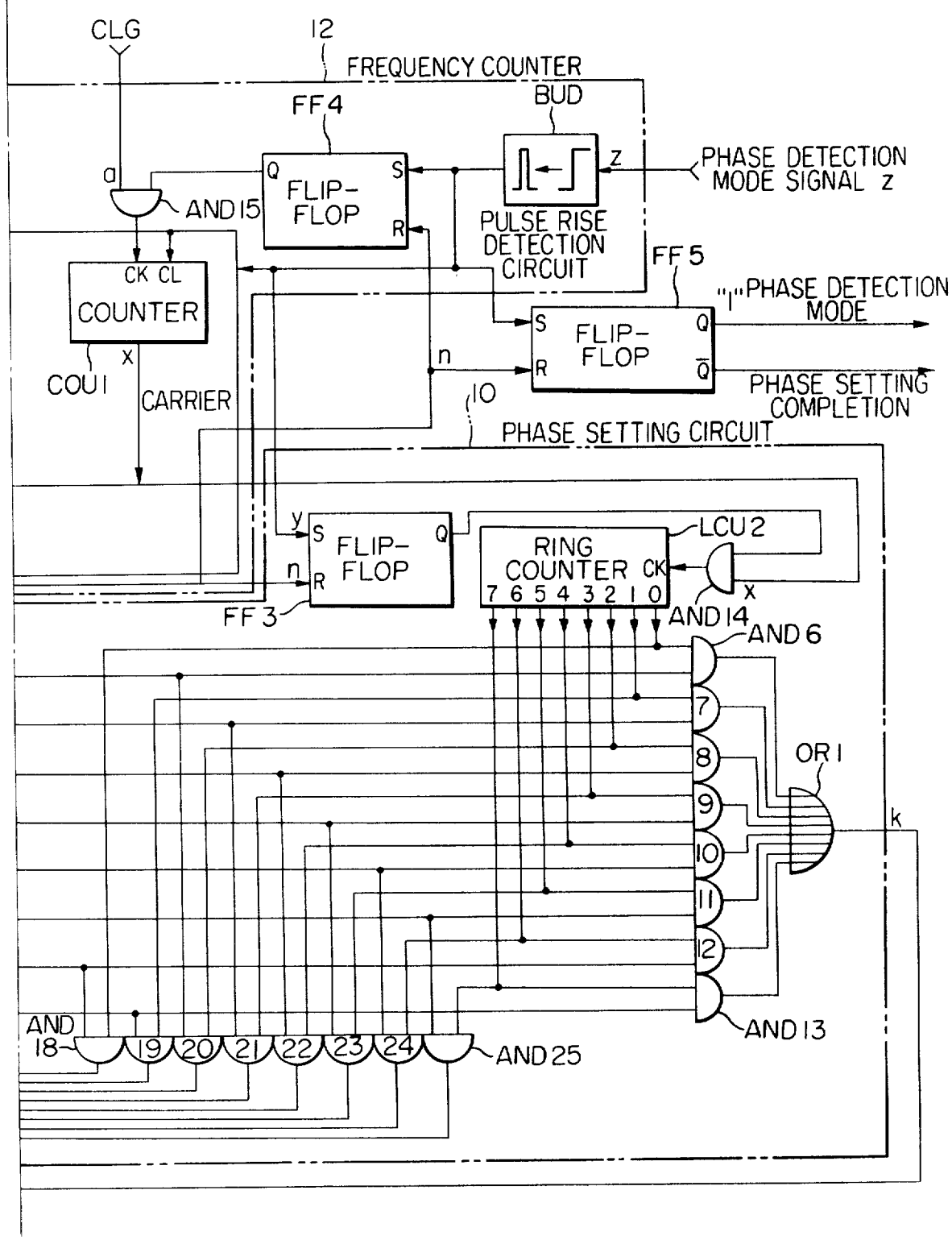
FIG. 11 is a circuit diagram of a modification of the second embodiment shown in FIG. 9.

Second Embodiment, FIGS. 9, 10 and 11

In FIG. 9 is shown a second embodiment of the present invention based upon the principle described above with reference to FIG. 2. The second embodiment is substantially similar in construction to the first embodiment shown in FIG. 3 except the gates AND1 and AND2 are eliminated.

The mode of operation will be described. It is assumed that the output pulses a from the clock pulse generator CLG has a frequency fa and a period Ta. Then the exciting signal generator 7 generates the exciting signal b at a frequency of fa/8. Therefore the ink jet nozzle 2 forms ink droplets at a rate of fa/8.

The phase setting circuit 10 generates 8 pulse trains c–j which have a frequency of fa/8 and a pulse width of Ta and are out of phase by Ta from each other. One of these pulse trains is transmitted as the output or reference pulse train k to the detection signal generator 8 while another pulse train q which is out of phase with the pulse train k by a predetermined angle is transmitted to the charging signal generator 9. The detection signal generator 8 handles two successive pulses of the pulse train k as a unit so that two successive pulses may be picked up but two successive pulses which immediately follow the picked up two successive pulses may not be picked up, thereby generating the output pulse train m. The charging signal generator 9 generates the charging signal which has a pulse width of for instance 5Ta measured from the center of the phase (sic) of the pulse train q and in which the pulse level represents the level of the video signal (which represents the position of a pattern element).

The detection signal z is at a low level "0" in the recording mode and is at a high level "1" in the detection mode. When the detection signal z is at a high level "1", the amplifier AMP2 is switched to the negative mode in which the output from the amplifier AMP2 is negative. (In the positive mode the output is positive for recording.) The output pulse train k is transmitted to the detection signal generator 8. When the output pulse train k is detected to have a predetermined phase relationship with the exciting signal b, the ink droplet train emerging from the charging electrode 3 has the charge pattern shown in FIG. 2(a). That is, two successive, negatively charged ink droplets and two successive uncharged ink droplets alternate. As described above with reference to FIG. 2(a), adjacent negative charged ink droplets and uncharged ink droplets are coalesced into the large ink droplets immediately after leaving the charging electrode 3. As a result, the ink droplet train passes through the photosensor 11 at a rate of fa/16 (=fa/8×½).

However when the pulse train k is not in a predetermined phase relationship with the exciting signal b, the ink droplets are not charged so that the ink droplet train passes through the photosensor 11 at a rate of N (fa/16<N≦fa/8).

When the rate N is equal to fa/16, the frequency discriminator or the frequency counter 12 generates a flag or enable signal so that the pulse train k which is in a predetermined phase relationship with the exciting signal b may be continuously generated by the phase setting circuit 10. On the other hand, when the rate N is greater than fa/16 but is equal to or smaller than fa/8, the phase setting circuit 10 automatically and progressively advances or lags the phase of its output pulse train for a predetermined time interval. That is, the phase setting circuit 10 sequentially generates eight pulse trains c–j until one of them is found to be in a predetermined phase relationship with the exciting signal b. In this way, the ink droplet train passes through the photosensor 11 at the rate of fa/8, and then the phase setting circuit 10 suspends its phase shift operations.

Thereafter the detection mode is switched to the recording mode. The detection signal generator 8 is de-energized while the charging signal generator 9 is enabled. The amplifier AMP2 is switched to the positive mode. The ink jet printing or recording is started at the rate of fa/8. The ink droplets are attracted toward the recording medium 6 or trapped in the gutter as indicated by the dotted lines in FIG. 9.

In FIG. 10 are shown in detail the detection signal generator 8, the phase setting circuit 10 and the frequency discriminator or the frequency counter 12 of the second embodiment.

The detection signal generator 8 comprises a first flip-flop FF1, a second flip-flop FF2, AND gates AND3, AND4 and AND5 and a monostable multivibrator MMB1. The flip-flops FF1 and FF2 are set in response to the rise or positive edge of the input signal pulse 1 and is reset in response to the fall or the negative edge of the reset pulse. The monostable multivibrator MMB1 determines the pulse width Ta (1/fa) of the output pulse train m (See FIG. 5).

The phase setting circuit 10 and the frequency discriminator or the frequency counter 12 are substantially similar in both construction and mode of operation to those of the first embodiment so that no further description shall be made in this specification.

Referring back to FIG. 9, the charging signal generator 9 is substantially similar both in construction and mode of operation to that described in detail with reference to FIG. 6 so that no further description shall be made in this specification.

A modification of the second embodiment shown in FIG. 11 is substantially similar in construction to the first embodiment shown in FIG. 10 except that the frequency discriminator or the frequency counter 12 is substantially similar in construction to that described in detail with reference to FIG. 7 so that no further description shall be made in this specification.

Figure 12:
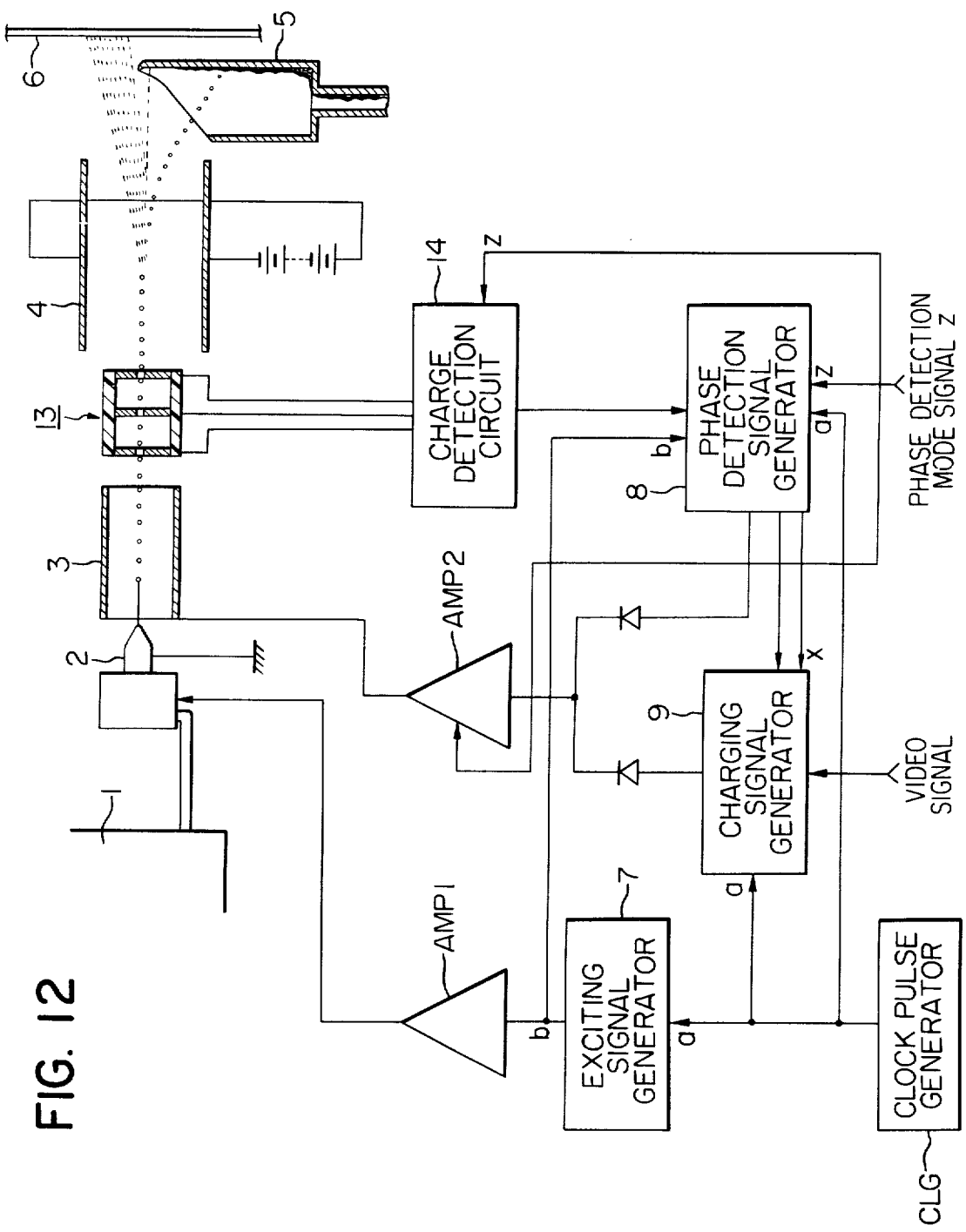
FIG. 12 is a block diagram of a third embodiment of the present invention.
Figure 13:
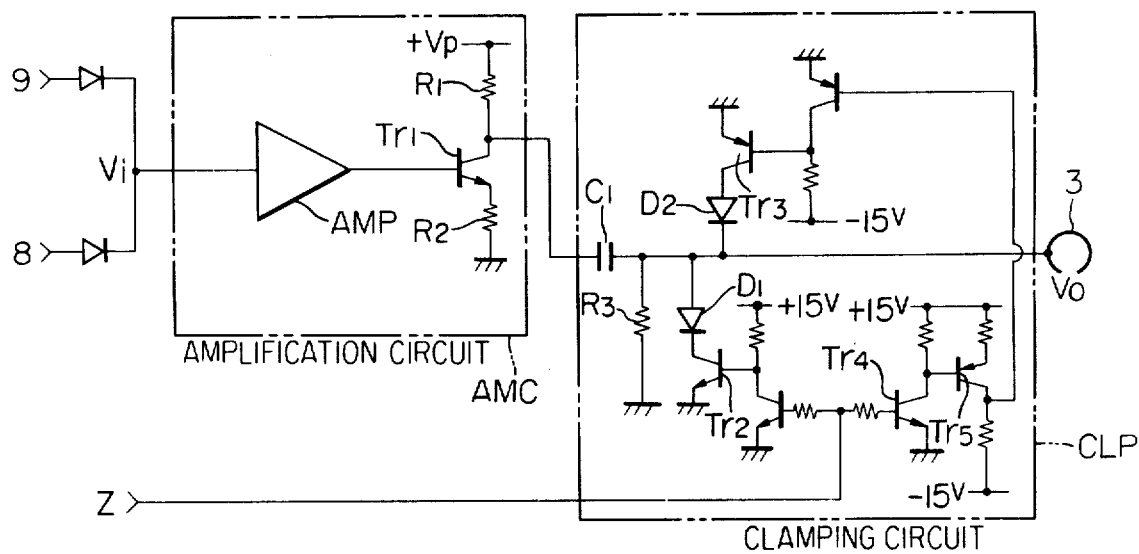
FIG. 13 is a circuit diagram of an amplifier AMP2 thereof.
Figure 14:
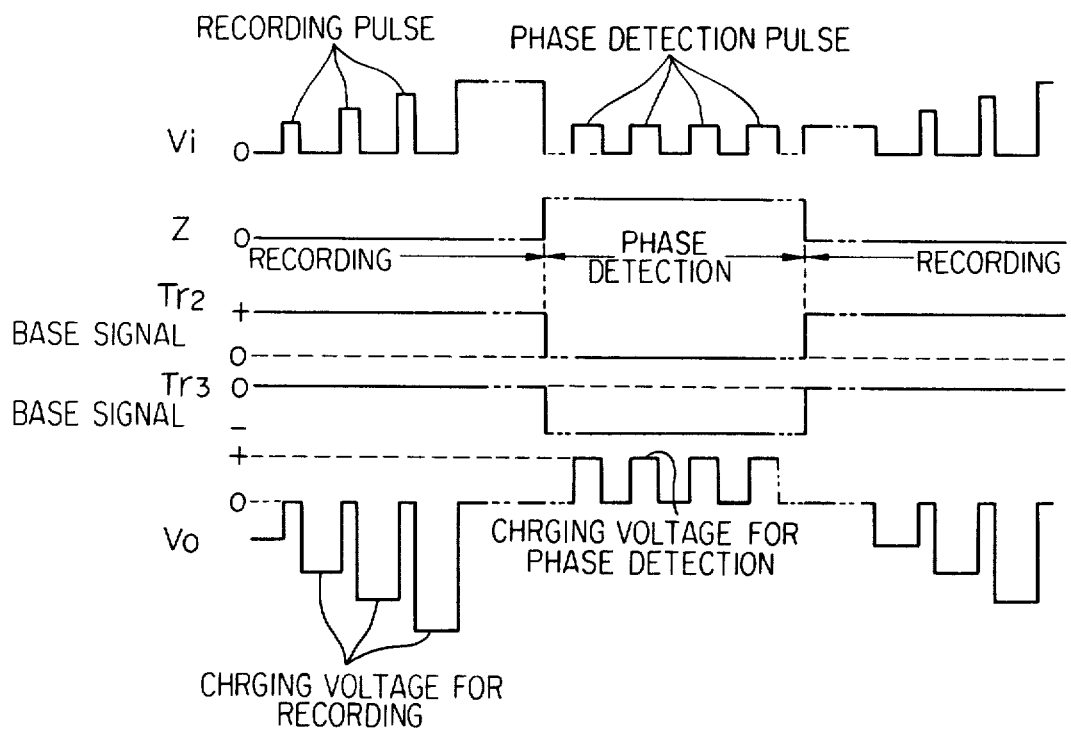
FIG. 14 shows the waveforms of pulses derived in the third embodiment shown in FIG. 12 and used for the explanation of the mode of operation thereof.

Third Embodiment FIGS. 12, 13 and 14

In the third embodiment shown in FIG. 12, instead of the photosensor 11 of the first or second embodiment, an electrode type charge sensor 13 is employed, and one amplifier is used for deriving both the positive, recording output voltage and the negative, phase detection output voltage.

In the charge phase detection mode, a charge detection circuit 14 detects the variations in potential difference between the electrodes of the electrode type charge sensor 13 when the charged ink droplets pass therethrough and generates the ink droplet detection pulse output which in turn is transmitted to the detection signal generator 8. In response to the detection instruction z and the clock pulses a from the clock generator CLG, the detection signal generator 8 generates a plurality (eight in the third embodiment) of pulse trains c–j (See FIG. 5) which are out of phase from each other by $2\pi/n$ (where n = the number of pulse trains) and also out of phase from the exciting signal b by $(2\pi/n) \times i$ (where i = 1, 2, 3, ..., and n). These pulse trains c–j are sequentially transmitted one at a predetermined time interval to the amplifier AMP2. For instance, first the pulse train c is transmitted to the amplifier AMP2 for a predetermined time interval, and then the next pulse train d is transmitted, and so on. As a result, the charging electrode 3 is impressed with a plurality of output pulse voltage trains which are also out of phase from each other by $2\pi/n$. The charge detection circuit 14 detects the charges of the ink droplets passing through the electrode type charge sensor 13 in the manner described above. In response to the output from the charge detection circuit 14, the detection signal generator 8 detects the charge phase of the ink droplet train passing through the charge sensor 13 so as to cause the phase of the output pulse train from the charging signal generator 9 to coincide with the phase of the ink droplets.

As described above, the amplifier AMP2 which serves as a charging voltage generator must generate the positive output voltage in the recording mode and the negative output voltage in the phase detection mode. In FIG. 13 is shown in detail this amplifier AMP2 while in FIG. 14 are shown various output waveforms at various points in the amplifier AMP2. The amplifier AMP2 includes an amplification circuit AMC which comprises an operational amplifier amp and a transistor $Tr_1$. Either the recording pulse or phase detection pulse is applied to the amplifier amp, and the degree of conduction of the transistor $Tr_1$ is dependent upon the level of the recording or phase detection pulse. The level of the output pulse derived from AMC represents the level of the charging voltage.

The output pulse from the amplification circuit AMC is transmitted to a positive or negative polarity clamping circuit CLP consisting of a time constant circuit comprising a capacitor $C_1$ and a resistor $R_3$, diodes $D_1$ and $D_2$, a complementary switching transistor pair $Tr_2$ and $Tr_3$, and transistors $Tr_4$ and $Tr_5$.

The transistor $Tr_2$ remains disabled in the phase detection mode; that is, when the phase detection mode signal z is "1" so that the diode $D_1$ is cut off. The signal z is transmitted through the switching circuit consisting of the transistors $Tr_4$ and $Tr_5$ to the base of the transistor $Tr_3$ so that the latter is enabled and consequently the diode $D_2$ is short-circuited. In summary, in the phase detection mode, in response to the signal z which is "1", the transistor $Tr_3$ and the diode $D_2$ are turned on. As a result, the negative extremity of the output voltage pulse from the amplification circuit AMC is clamped or restored to zero so that the positive voltage pulse (positive with respect to the ground) may be applied to the charging electrode 3.

In the printing mode; that is, when the signal z is at a low level "0", transistor $Tr_2$ is turned on while transistor $Tr_3$ is turned off. Therefore the diode $D_2$ is turned on so that the positive extremity of the output voltage pulse is clamped to zero so that the negative pulse voltage is applied to the charging electrode 3. The level of the negative pulse voltage is dependent upon the degree of conduction of the transistor $Tr_1$ and represents the level of the recording pulse.

In summary, the input signal Vi is the recording pulse or the phase detection pulse depending upon the phase detection mode signal being "0" or "1" so that the output Vo is the negative pulse voltages for recording or the positive pulse voltages for phase detection as shown in FIG. 14. To reverse the polarities of the output VO, the signal Z="0" is used to designate the phase detection mode while the signal Z="1", the recording mode. The third embodiment is therefore advantageous in that only one amplifier AMP2 is required for deriving both the positive and negative output pulse voltages.

Fourth Embodiment, FIGS. 15–19

Figure 15:
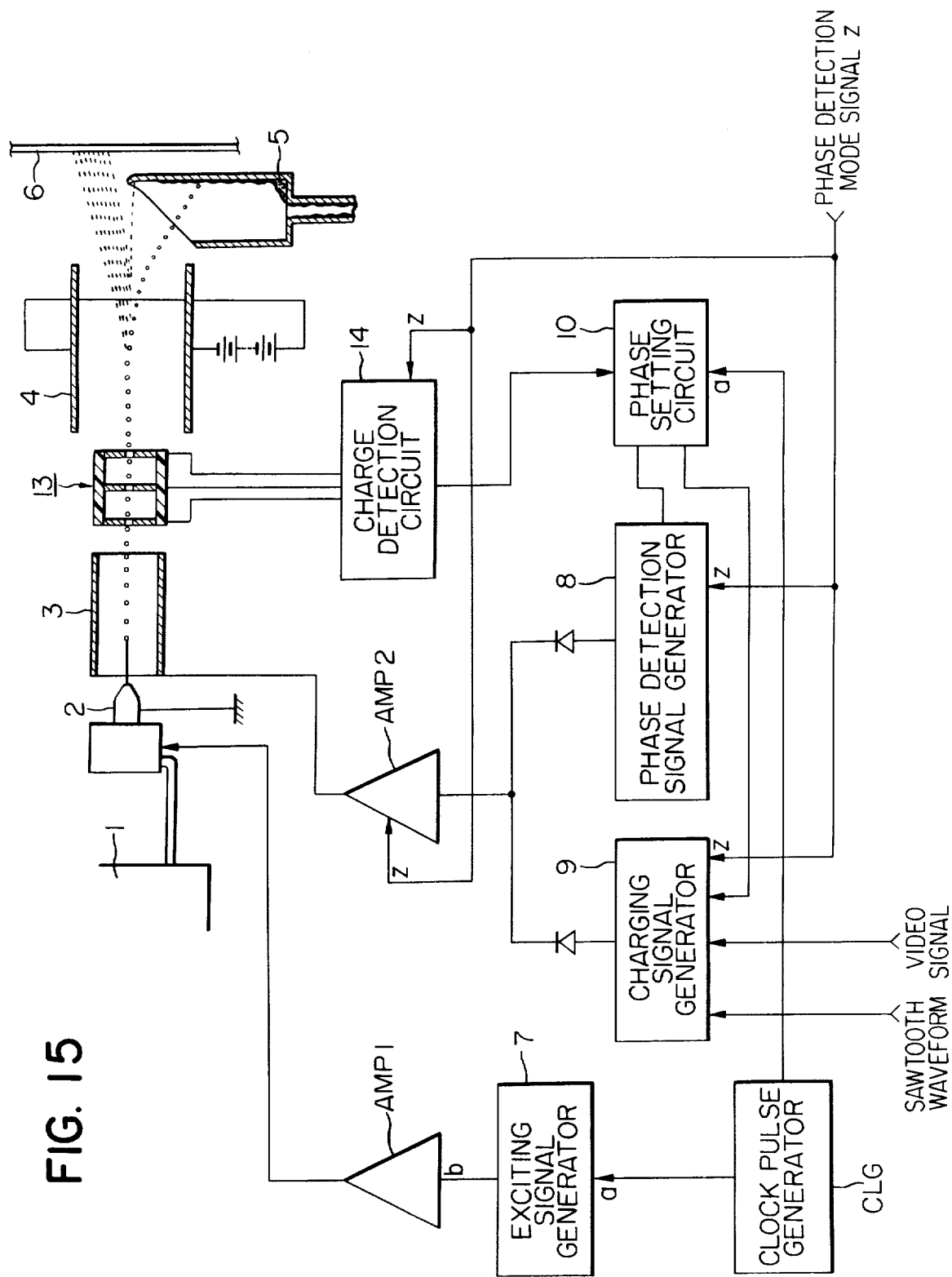
FIG. 15 is a block diagram of a fourth embodiment of the present invention.
Figure 16:
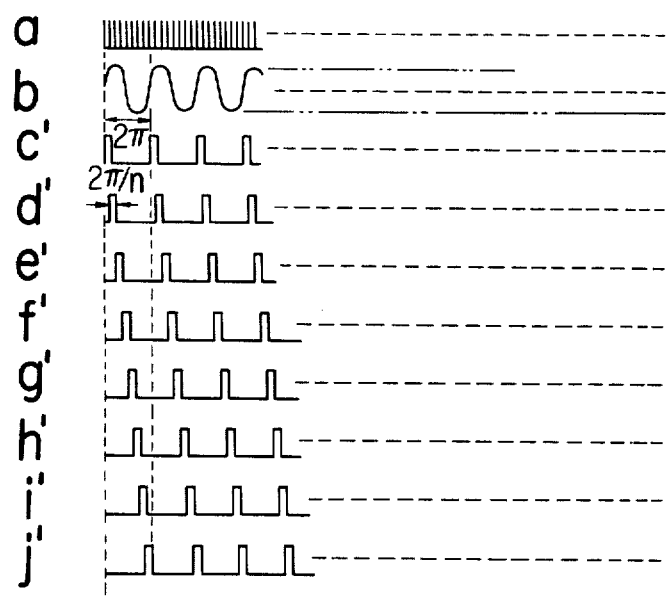
FIG. 16 shows waveforms of pulses used for the explanation of the mode of operation thereof.

The fourth embodiment shown in FIG. 15 is substantially similar in construction to the third embodiment described above with reference to FIG. 12 except that the phase setting circuit 10 is added.

The detection signal generator 8 generates a number of n pulse trains which are out of phase from each other by $2\pi/n$ where $2\pi$ is one cycle of the exciting signal b and are sequentially applied to the amplifier AMP2 at a predetermined time interval in response to the output signal from the phase setting circuit 10. For instance, the detection signal generator 8 generates the pulse train c' shown in FIG. 16 with respect to the clock pulse a and the exciting signal b. The pulse train c' has a pulse width of $2\pi/n$ and a pulse spacing of $2\pi$. After a predetermined number of pulse of the train c', the next pulse train d' which lags by $2\pi/n$ the pulse train c' is transmitted. After a predetermined number of pulses of the train d' have been transmitted, the pulse train e' follows which lags by $2\pi/n$ the pulse train d', and so on.

Meanwhile the charge detection circuit 14 which is monitoring the charged conditions of the ink droplets generates and transmits the output signal representative of "optimum ink droplet charging" to the phase setting circuit 10. Then the phase setting circuit 10 causes the pulse train which is now being generated by the charging signal generator 10 to be set to the phase of the optimum charging. More specifically, the phase at the center of the high level pulse width is set to the phase with respect to the exciting signal b of one of the pulse trains which is being generated from the detecting signal generator 8 when the optimum charging detection signal is derived. As a result, the pulse which is applied to the charging electrode 3 in the case of recording has a forwardly and rearwardly extended width of the optimum charging phase so that the charging of the ink droplets may be positively effected.

However, as described above, the pulse width of the phase detection pulses is set to $2\pi/n$ where $2\pi$ is the period of the exciting signal b and consequently is relatively narrow. As a result, the frequency components of each pulse are spread over a wide range so that the amplifier AMP2 must have the frequency response characteristic over a wide range. Especially when the frequency of the exciting signal b is higher than 100 KHz, the frequency response characteristic of the amplifier AMP2 presents serious problems. That is, the design of the amplifier AMP2 becomes very difficult or the cost of the amplifier AMP2 becomes inhibitively expensive. Furthermore the pulse rising and falling characteristics are so degraded that an accuracy with which the phase is detected is considerably lowered. The fourth embodiment of the present invention therefore contemplates to overcome the above and other problems by facilitating the amplification of the phase detection pulses to a level required for charging the ink droplets and by improving the rising and falling characteristics of the charging pulse voltages for phase detection.

Figure 18:
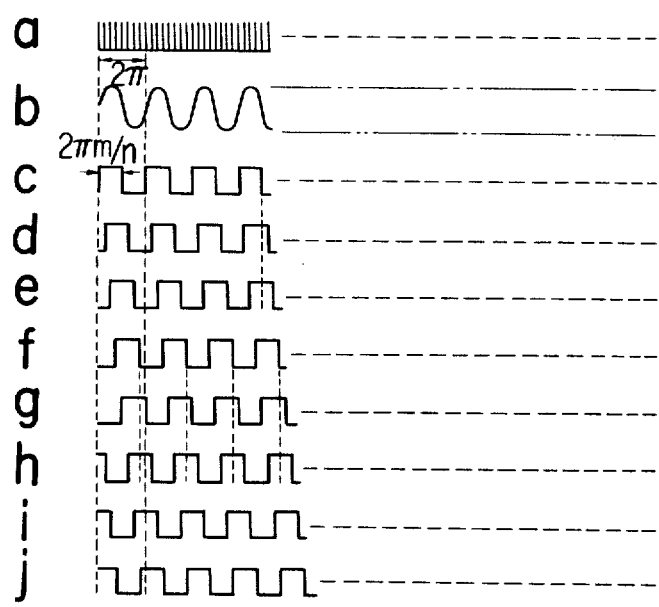
FIG. 18 shows waveforms of signals and pulses used for the mode of operation of the fourth embodiment.
Figure 17B:
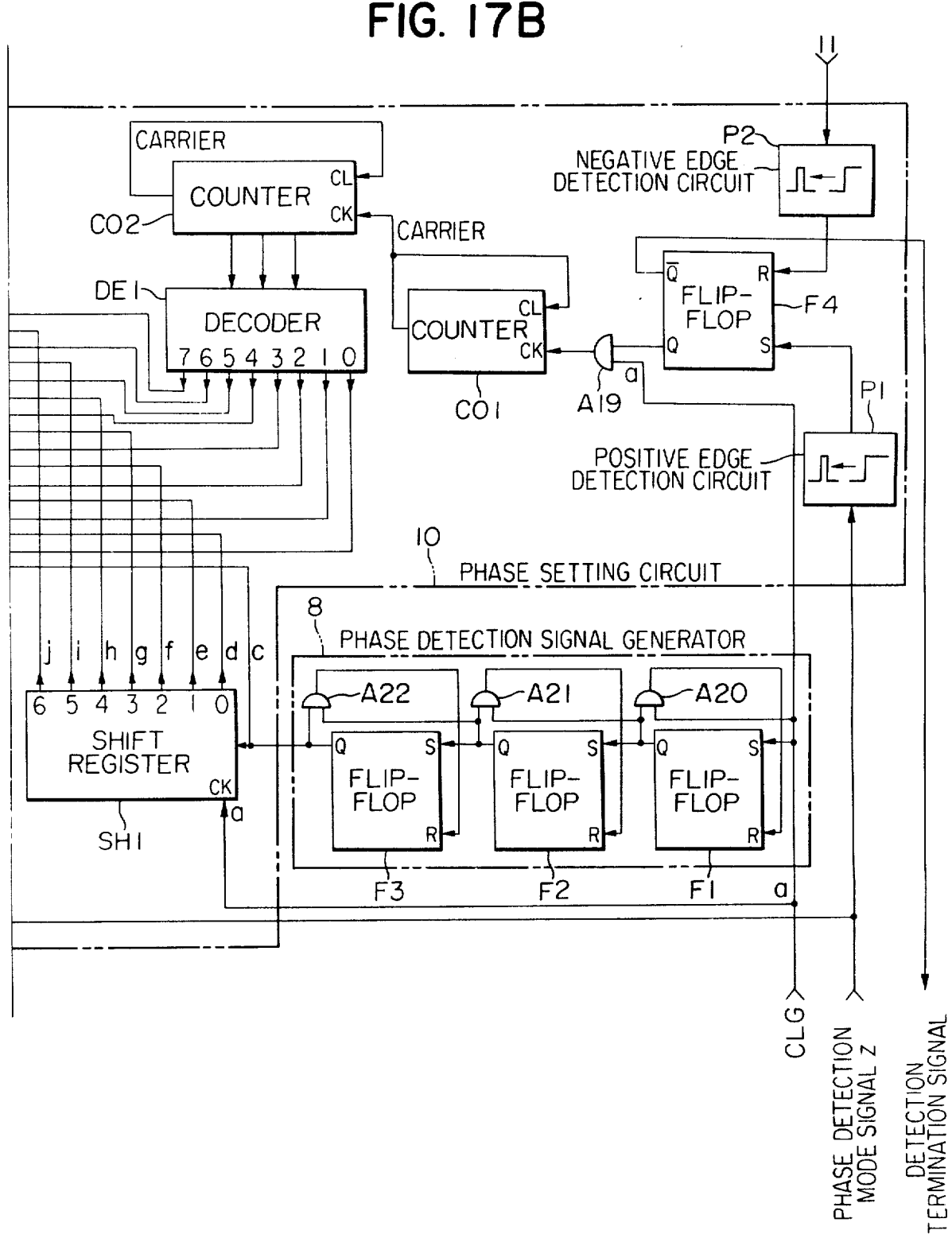
FIG. 17 is a circuit diagram of a charging signal generator 8, another charging signal generator 9 and a phase setting circuit 10 thereof.

In FIG. 17 is shown in detail the detection signal generator 8. It comprises three flip-flop F1–F3 and three AND gates A20–A22. The flip-flops F1–F3 are set in response to the negative edge of the pulse input applied to their set terminals S and are reset in response to the positive edge of the input pulse applied to the reset terminal R. The detection signal generator 8 is responsive to the clock pulses a (See FIG. 18) for producing a pulse train c (See also FIG. 18) which has a frequency same with the exciting signal b and a pulse width equal to one half of the period $2\pi$ of the signal b. The pulse train c is transmitted to a serial input—parallel output type shift register SH1 in the phase setting circuit 10. The clock pulses a are applied as the shift clock to the shift register SH1. The pulse trains d–j shown in FIG. 18 are derived from the output terminals 0–6 of the shift register SH1.

In addition to the shift register SH1, the phase setting circuit 10 further includes a positive edge detection circuit P1 for detecting the rising of the phase detection mode signal z (which rises to a high level "1" in the case of the phase detection mode), a negative edge detection circuit P2 for detecting the falling of the optimum charging detection signal from the charge detection circuit 11 (which rises to a high level "1" when the optimum charging is detected), a flip-flop F4 which is set by the output pulse from the positive edge detection circuit P1 and is reset in response to the output pulse from the negative edge detection circuit P2, an AND gate A19 which is enabled in response to the Q output (a high level "1") from the flip-flop F4 so as to pass the clock pulses a, a counter CO1 for generating a carrier pulse when it has counted a predetermined number of clock pulses a and counting up again from 1, a counter CO2 for counting the carrier pulses from the counter CO1, a decoder DE1 for decoding the contens in the counter CO2, a first group of AND gates A1-A8 and a second group of AND gates A11-A18 both of which receive the inputs from the shift register SH1 and the decoder DE1; an OR gate OR1 which delivers the output when it receives the input from at least one of the AND gates A1-A8 in the first group, an AND gate A9 for transmitting the output from the OR gate OR1 to the amplifier AMP2 when the phase detection mode signal z is also being applied thereto, and an OR gate OR2 for delivering the output when it receives the output from at least one of the AND gates A11-A18 in the second group.

In response to the positive edge of the phase detection mode signal z which rises to a high level "1", the flip-flop F4 is set so that the AND gate A19 is enabled to pass the clock pulses a to the counter CO1. When the counter CO1 counts a predetermined number of clock pulses a (for instance, 30×9; that is, a time interval required for forming 30 ink droplets), it generates one carrier pulse and is reset so as to count up again the clock pulses a. The counter CO2 counts the carrier pulses derived from the counter CO1, and the outputs "1" are sequentially derived from the output terminals 0–7 of the decoder DE whenever the counter CO1 counts a predetermined number of clock pulses a. Consequently, whenever the counter CO1 counts a predetermined number of clock pulses a, the AND gate A1-A8 sequentially receives the enable signal "1". When a predetermined number (for instance, 30) of pulses c pass through the AND gate A1, the AND gate A2 is enabled to pass a predetermined number (30, for instance) of pulses d. Next the AND gate A3 is enabled to pass a predetermined number (30) of pulses e, and so on. Thus the pulse trains c-j, which are out of phase from each other by $2\pi/n$ as described above, are sequentially passed through the OR gate OR1 and the AND gate A9 to the amplifier AMP2.

The amplifier AMP2 delivers to the charging electrode 3 the output voltage pulses having a predetermined level in synchronism with the output pulses from the OR gate OR1. The output voltage pulses are positive or negative when the output pulse voltages for recording are negative or positive.

While the amplifier AMP2 is delivering the output voltage pulses in synchronism with the pulse train for instance f from the OR gate OR1 in the manner described above, the charge detection circuit 11 detects the optimum charging and generates the output "1". In response to the positive edge of this output "1", the positive edge detection circuit P2 generates the output pulse and applies it to the reset terminal R of the flip-flop F4 so that the latter is reset and consequently the AND gate A19 is disabled to interrupt the transmission of the clock pulses a to the counter CO1. As a result, neither of the counters CO1 and CO2 will continue counting so that one (for instance, 3) of the output terminals 0–7 of the decoder DE1 keeps delivering the output "1".

When the flip-flop F4 is reset, it generates a high level signal "1" at its $\bar{Q}$ output terminal. That is, the $\bar{Q}$ output represents the completion of the phase detection. Thereafter until the phase detection mode signal (z=1) is received again, the output "1" remains appearing at the output terminal 3 of the decoder DE1 so that only the AND gate A4 in the first AND gate group A1-A8 and the AND gate A14 in the second AND gate group A11-A18 receive the enable signal "1". As a result, the pulse train f is continuously delivered to the amplifier AMP2 through the OR gate OR1 and the AND gate A9, and the pulse train h representative of the completion of the phase detection or phase setting in charging the ink droplets is continuously delivered through the OR gate OR2 to the AND gate A10 in the charging signal generator 9.

In response to the phase detection completion signal, that is, the $\bar{Q}$ output of the flip-flop F4="1", the printer is switched to the recording mode and the detection mode signal drops to "0" so that the AND gate A9 is disabled. The AND gate A10 in the charging signal generator 9 receives the enable signal ($\bar{z}$="1") so that when it also receives the video signal "1", the pulse train h is delivered from the OR gate OR2 through the AND gate A10 to the monostable multivibrator MMB1.

The reason why the pulse train h is delivered to the charging signal generator 9 while the optimum charging is obtained in response to the pulse train f will be described. The fact that the optimum charging is obtained in response to the pulse train f not to the preceding pulse train e means that the optimum charging phase exists after a point spaced apart by $2\pi/n$ from the falling edge of the pulse f. Therefore the pulse train h in which the negative edge of the pulse f substantially coincides with the center of the pulse h is delivered to the charging signal generator 9 so that the latter may generate the output pulse which has a high level and a pulse duration centered around the negative edge of the pulse f. To this end, two output terminals (for instance, 2 and 4) of the decoder DE1 from which the enable signals may be derived in a predetermined time relationship are connected to one of the first AND gate group (for instance A4) and to one of the second AND gate group (for instance A14).

In the charging signal generator 9, the monostable multivibrator MMB1 is triggered in response to the positive edge of the input pulse h and generates the output pulse with a pulse duration from 50 to 70% of $2\pi$. The semiconductor switching circuit SSC is enabled in response to the output pulse from the monostable multivibrator MMB1 so that the charging signal generator 9 delivers to the amplifier AMP2 the charging signal which causes the ink droplet to deflect as indicated by the dotted lines in FIG. 15.

In the fourth embodiment, the digital phase shift operations are used, but it is to be understood that the analog phase shift operations by an analog phase-shift circuit using delay lines may be equally employed. Furthermore, instead of inserting the phase detection signal generator 8 in front of the phase setting circuit 10, it may be inserted behind the circuit 10. To this end, instead of the shift register SH1, a ring counter is used so as to obtain the pulse trains c'-j' shown in FIG. 16. These pulse trains are transmitted to the AND gates A1-A8 and A11-A18, and the output from the AND gate is applied to a pulse duration setting circuit such as a monostable multivibrator; that is, the detection signal generator, whereby the output pulse with a desired pulse width or duration may be obtained.

Figure 19:
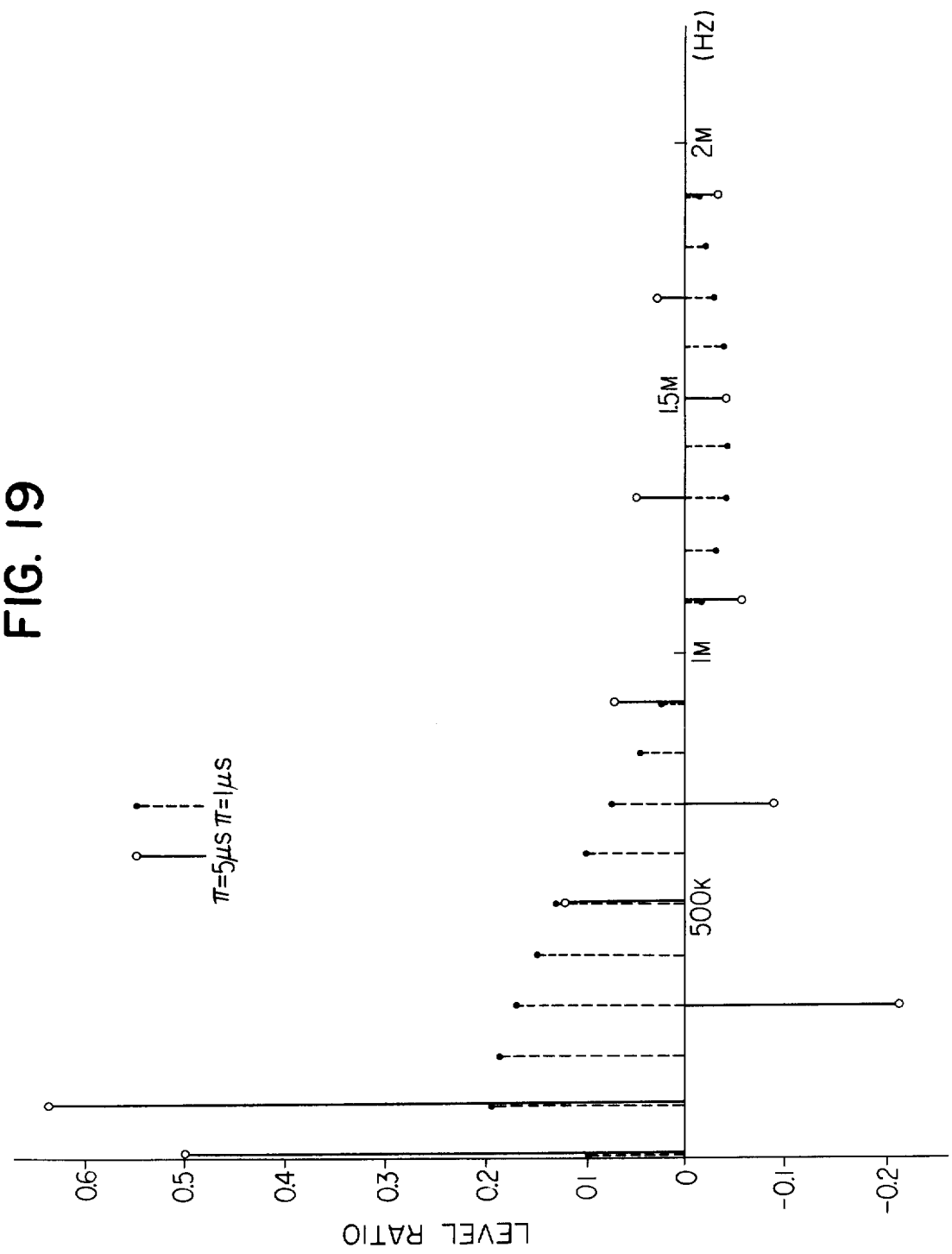
FIG. 19 is a graph illustrating the Fourier expansions of the phase detection pulses with pulse duration of one and five microsecond.

In FIG. 19 is shown the frequency distribution obtained by Fourier expansion when the phase detection pulses have a pulse duration $2\pi/n = 1\mu s$. It is seen that the relative amplitudes are high over a wide range. However when the pulse duration is set to $2\pi m/n = 5\mu s$ according to the fourth embodiment of the present invention, the frequencies with high relative amplitude levels are limited in a relatively small region of low frequencies as shown in FIG. 19. When the frequency response of the amplifier AMP2 is less than 1 MHz, the phase detection pulses with the pulse width or duration of $\tau = 1\mu s$ are considerably distorted in waveform, but according to the fourth embodiment of the present invention, the distortions of the phase detection pulses with the pulse duration of 5 microsecond may be minimized. Furthermore it should be noted that the period of the exciting signal; that is, the rate of emission of ink droplets (the number of ink droplets per second) remains unchanged. Thus it is apparent that the fourth embodiment of the present invention is very advantageous in that the phase detection pulses may be easily processed and accordingly the pulse voltages for charging the ink droplets for phase detection may be generated at an extremely higher degree of accuracy.

What is claimed is:

1. A charge phase control device for use in an ink jet printing or recording device comprising
   an exciting signal generator for generating the exciting signal so as to cause the emission of ink droplets,
   a first charging signal generator for generating the charging signal so as to charge the ink droplets positively or negatively in the recording mode,
   a second charging signal generator for generating the charging signal so as to charge a second set of ink droplets negatively or positively in the phase detection mode,
   a charging electrode responsive to said charging signal from said first or second charging signal generator for positively or negatively charging the ink droplets,
   an ink droplet detection means disposed between said charging electrode and a gutter for detecting the ink droplets flying from said charging electrode to said gutter,
   a frequency discriminator or a frequency counter for integrating or counting the ink droplet detection pulses from said ink droplet detection means so as to discriminate or count the frequency of said pulses and generating a flag signal when the discriminated or counted frequency is less than a predetermined value, and
   a phase setting circuit responsive to said flag signal from said frequency discriminator or said frequency counter for locking the phase of said exciting signal to the phase of the ink droplet charging, whereby in response to the phase detection mode signal, said second charging signal generator,
   said frequency discriminator or said frequency counter and said phase setting circuit are energized so that said charging electrode may receive the negative or positive pulse voltages of the same frequency with that of said exciting signal, thereby charging the ink droplets in such a way that more than two successive ink droplets may be negatively or positively charged and one or more succeeding ink droplets may be uncharged or positively or negatively charged.

2. A charge phase control device as set forth in claim 1 wherein said ink droplet detection means comprises a photosensor which is interposed between said charging electrode and a pair of deflection electrodes.

3. A charge phase control device as set forth in claim 1 wherein said ink droplet detection means comprises charge detecting electrode means interposed between said charging electrode and a pair of deflection electrodes.

4. A charge phase control device as set forth in claim 1 further comprising
   an amplification circuit responsive to input pulses from said charging signal generators for generating voltage pulses to be impressed on said charging electrode, and
   a clamping circuit which includes semiconductor switching elements which are so designed and arranged that in response to said phase detection mode signal they are enabled and disabled so as to clamp the positive or negative extremity of the output voltage pulses from said amplification circuit to a zero level.

5. A charge phase control device as set forth in claim 1 wherein said phase setting circuit comprises
   a first circuit means for receiving and frequency dividing the clock pulses, so as to generate a plurality of pulse trains which have the same frequency but are out of phase from each other by a predetermined angle,
   a second circuit means for sequentially deriving from said first circuit means said plurality of pulse trains at a time for a predetermined time interval, and
   a third circuit means responsive to said flag signal from said frequency discriminator or said frequency counter for de-energizing or disabling said second circuit means.

6. A charge phase control device as set forth in claim 2 further characterized in that
   the pulse width or duration of said phase detection pulses is a few times as long as the phase difference between said plurality of pulse trains.

7. A charge phase control device as set forth in claim 2, wherein the pulse width or duration of said phase detection pulses is an integral multiple of the phase difference between said plurality of pulse trains.

* * * * *